US008111981B2

(12) United States Patent  (10) Patent No.: US 8,111,981 B2
Ichimiya et al.  (45) Date of Patent: *Feb. 7, 2012

(54) FOCUS DETECTION APPARATUS AND FOCUS DETECTION METHOD

(75) Inventors: Takashi Ichimiya, Yokohama (JP); Masanori Ohtsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/397,940

(22) Filed: Mar. 4, 2009

(65) Prior Publication Data

US 2009/0238551 A1  Sep. 24, 2009

Related U.S. Application Data

(63) Continuation of application No. 10/572,135, filed as application No. PCT/JP2005/023435 on Dec. 15, 2005.

(30) Foreign Application Priority Data

Dec. 24, 2004  (JP) .................................. 2004-374766
Feb. 8, 2005  (JP) .................................. 2005-031277

(51) Int. Cl.
  *G03B 3/00* (2006.01)
  *G03B 13/00* (2006.01)
(52) U.S. Cl. .......................................... 396/96; 348/345
(58) Field of Classification Search .................... 396/96, 396/106, 121–124, 91, 92; 348/297–299
  See application file for complete search history.

(56) References Cited

U.S. PATENT DOCUMENTS

| 4,792,668 | A | * | 12/1988 | Akashi et al. | ............... 250/201.2 |
| 5,097,282 | A | * | 3/1992 | Itoh et al. | ....................... 396/123 |
| 5,278,602 | A | * | 1/1994 | Honma et al. | .................. 396/92 |
| 5,740,477 | A | | 4/1998 | Kosako et al. | |
| 5,808,291 | A | | 9/1998 | Nakamura | |

FOREIGN PATENT DOCUMENTS

| JP | 62-133409 | 6/1987 |
| JP | 63-30814 | 2/1988 |
| JP | 63-172206 | 7/1988 |
| JP | 9-54242 | 2/1997 |
| JP | 10-39201 | 2/1998 |
| JP | 10-104502 | 4/1998 |

(Continued)

OTHER PUBLICATIONS

The above reference was cited in a Mar. 3, 2010 US Office Action that issued in related U.S. Appl. No. 10/572,135.

(Continued)

*Primary Examiner* — W. B. Perkey
*Assistant Examiner* — Minh Phan
(74) *Attorney, Agent, or Firm* — Cowan, Liebowitz & Latman, P.C.

(57) ABSTRACT

This invention includes accumulation units (102a, 102b) which accumulate signals obtained by sensing units (111a, 111b), an area determination unit (103, 100) which sets the size of an area of a sensing unit to be segmented into a plurality of areas on the basis of the information of a lens to be focus-detected, accumulation control units (104a-104c, 105) which control, for each of the areas, accumulation of signals obtained in a plurality of areas by the accumulation units, and a defocus detection unit (100) which detects defocus states in the respective areas from accumulated signals from a plurality of areas.

5 Claims, 28 Drawing Sheets

FOREIGN PATENT DOCUMENTS

| | | |
|---|---|---|
| JP | 11-142724 | 5/1999 |
| JP | 11-281885 | 10/1999 |
| JP | 11-352394 A | 12/1999 |
| JP | 2001-099644 A | 4/2001 |
| JP | 2002-311327 | 10/2002 |
| JP | 2003-215442 | 7/2003 |
| JP | 2004-12557 | 1/2004 |

OTHER PUBLICATIONS

The above reference was cited in a Jun. 1, 2009 US Office Action that issued in parent U.S. Appl. No. 10/572,135.

Partial International Search Appln No. PCT/JP2005/023435, Jan. 31, 2006.

* cited by examiner

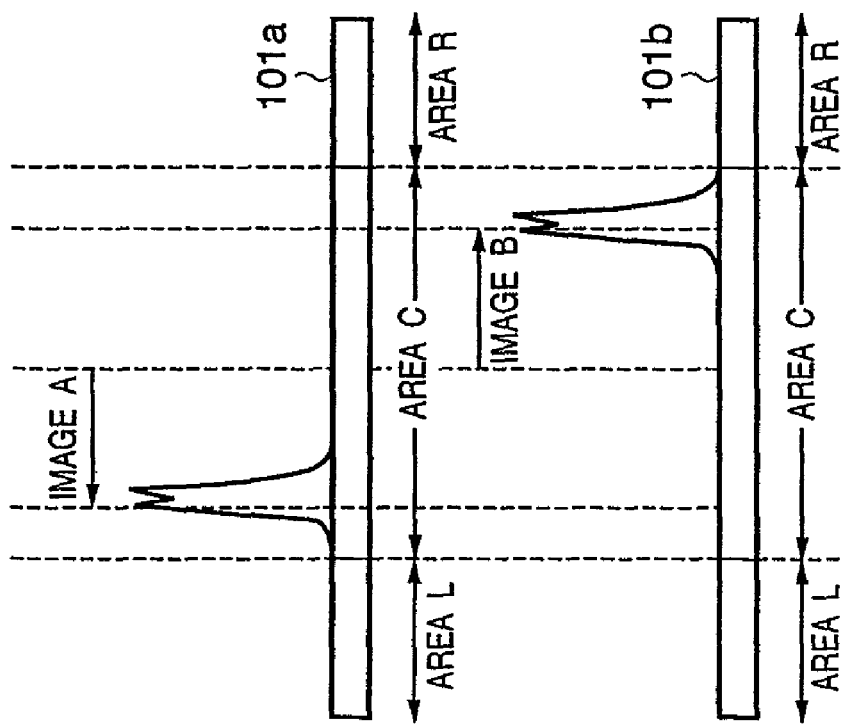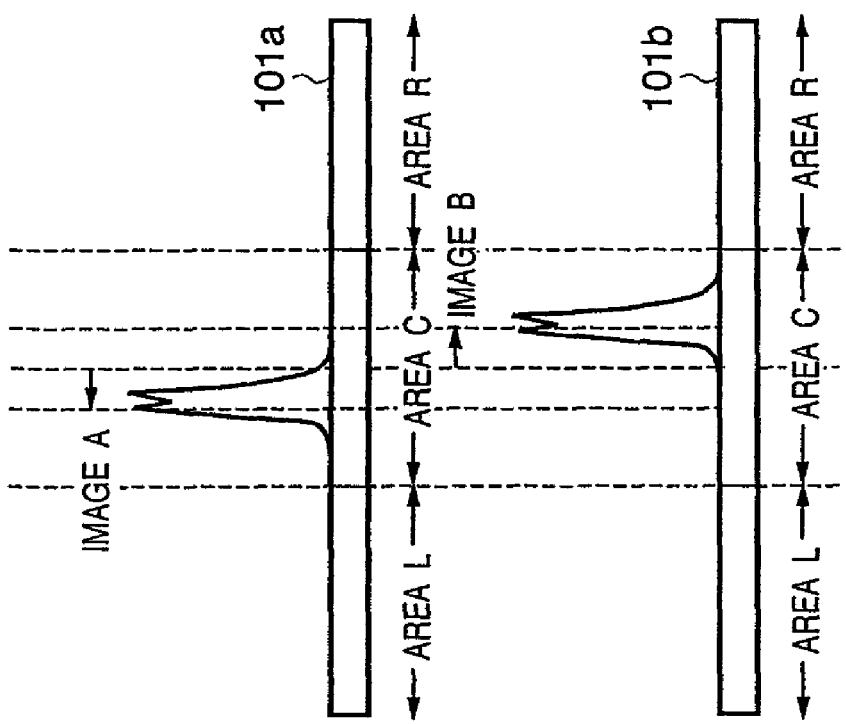

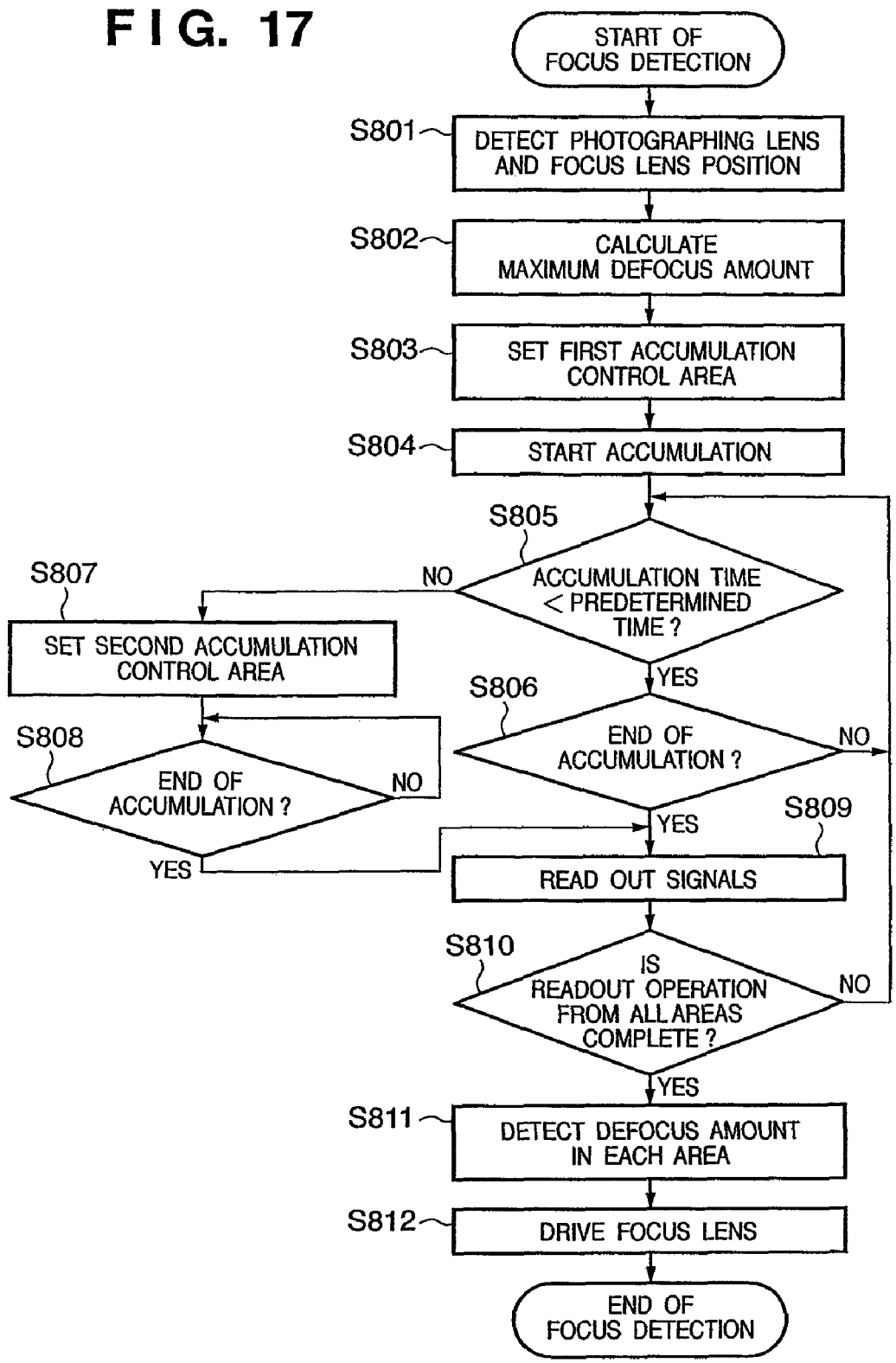

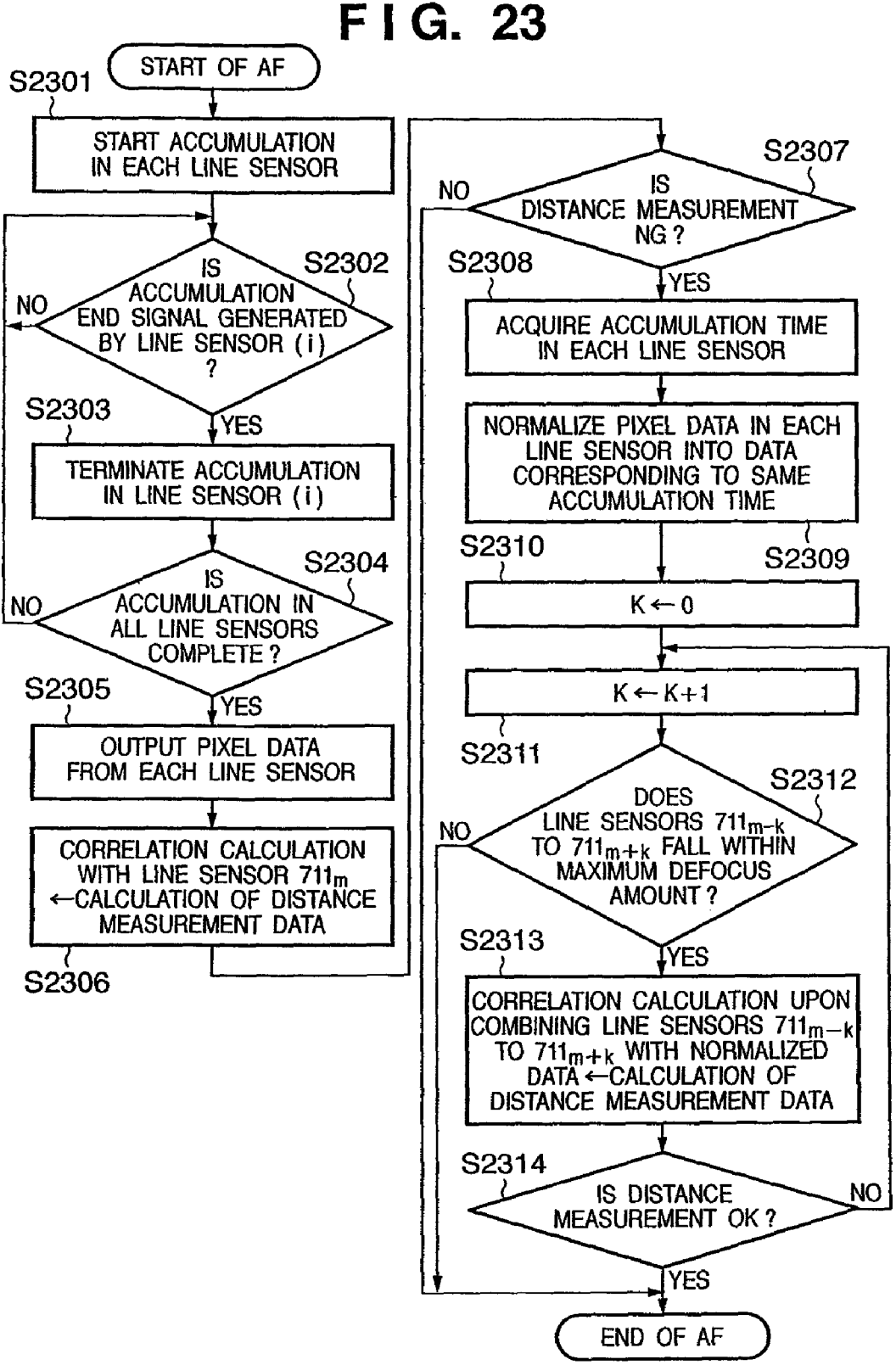

F I G. 24A
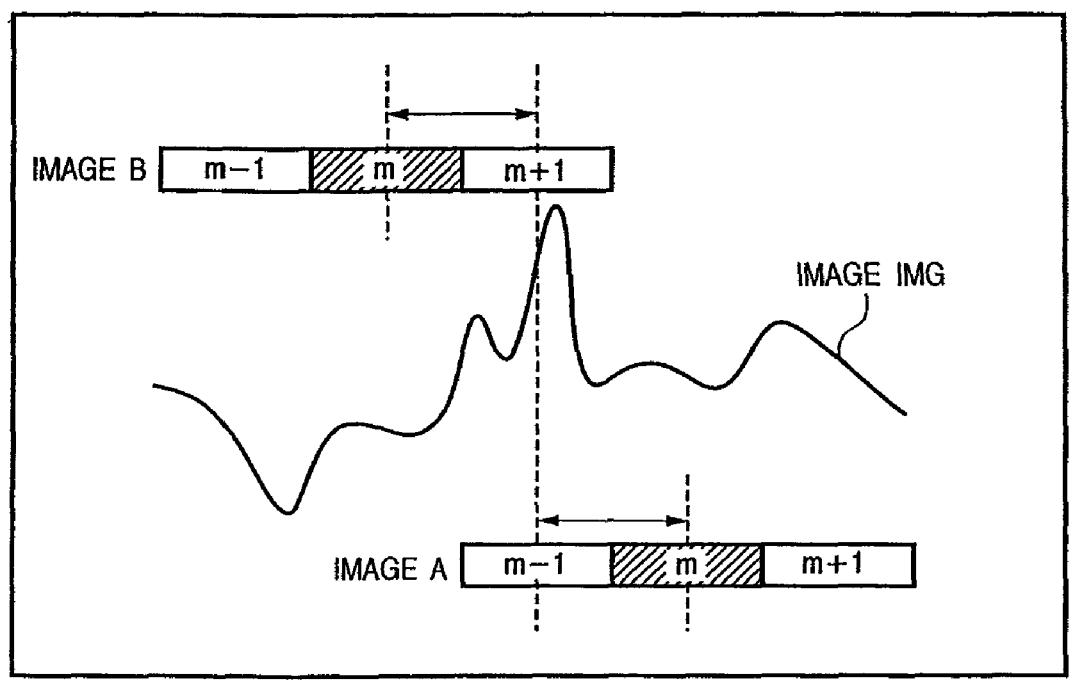

FIG. 24C
IMAGE A
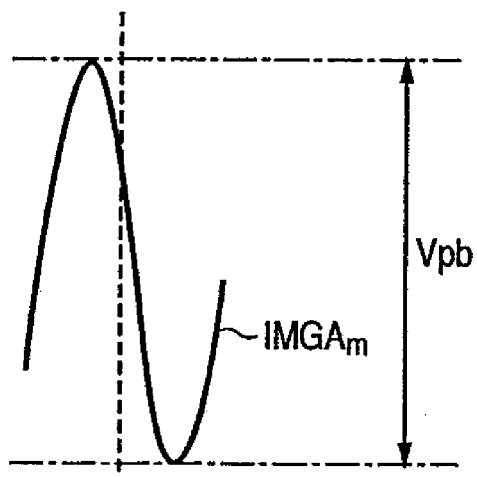
IMGA_m, Vpb
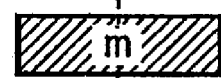
m
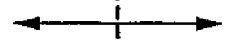
IMAGE B
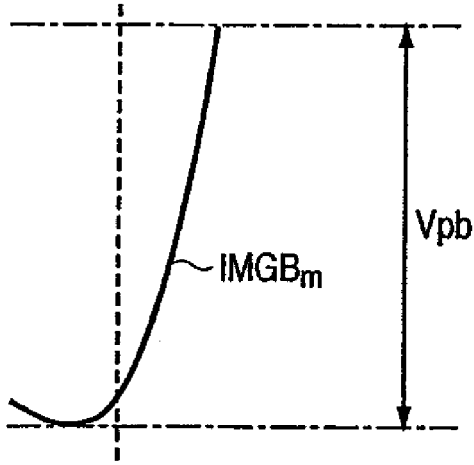
IMGB_m, Vpb
m

US 8,111,981 B2

FOCUS DETECTION APPARATUS AND FOCUS DETECTION METHOD

This is a continuation application of prior application Ser. No. 10/572,135, filed Mar. 15, 2006, to which priority under 35 U.S.C. §120 is claimed. This application also claims priority to PCT Application PCT/JP2005/023435 filed on Dec. 15, 2005 to which priority under 35 U.S.C. §371 is claimed. This application also claims priority to Japanese Patent Application No. 2004-374766 filed on Dec. 24, 2004 and Japanese Patent Application No. 2005-031277 filed on Feb. 8, 2005, the entire contents of which are incorporated herein by reference.

TECHNICAL FIELD

The present invention relates to a focus detection apparatus and focus detection method which detect distance measurement positions.

BACKGROUND ART

Conventionally, as a focus detection apparatus for a camera, a focus detection apparatus based on a so-called phase difference detection scheme is known (Japanese Patent Laid-Open No. 09-054242), which detects the defocus amount of an object to be photographed by forming light beams from the object, which have passed through different exit pupil areas of a photographing lens, into images on a pair of line sensors and obtaining the amount of displacement between the relative positions of a pair of object images obtained by photoelectrically converting the object images (which operation will be referred to as phase difference calculation hereinafter), and drives the photographing lens on the basis of the defocus amount.

As a focus detection apparatus of this type, a multifocus detection apparatus is known (Japanese Patent Laid-Open No. 2003-215442), which performs focus detection with respect to a plurality of objects to be photographed by segmenting a pair of line sensors into a plurality of areas, performing signal accumulation control for each area, and performing correlation calculation for a pair of object images obtained by photoelectric conversion in the respective areas.

In addition, a focus detection apparatus based on the phase difference detection scheme is known (Japanese Patent Laid-Open No. 63-172206), in which the defocus amount that can be detected can be adjusted by changing areas of a pair of line sensors which are used for accumulation control and phase difference calculation.

The focus detection apparatus disclosed in Japanese Patent Laid-Open No. 63-172206 can select proper accumulation control areas in accordance with a focus detection result and the maximum defocus amount of a photographing lens. If, however, focus detection cannot be performed, the accumulation control areas must be changed, and accumulation operation and calculation operation must be done again. This prolongs the time required for focus detection.

The focus detection apparatus disclosed in Japanese Patent Laid-Open No. 63-172206 can be applied to a multifocus detection apparatus, such as the focus detection apparatus disclosed in Japanese Patent Laid-Open No. 2003-215442, which can detect the focuses of a plurality of objects to be photographed. In this case, if accumulation control areas are small, no adjacent areas overlap. If, however, accumulation control areas are large, adjacent areas overlap. Since accumulation control cannot be simultaneously performed for overlapping areas, re-accumulation operation is performed for each area, resulting in a longer time required for focus detection.

DISCLOSURE OF INVENTION

It is an object of the present invention to realize a focus detection technique in which even if it is necessary to detect a defocus state upon enlarging the area of a sensing means, the necessity of re-accumulation in the enlarged area can be eliminated, and the detection time can be shortened.

In order to solve the above problems and achieve the above object, a focus detection apparatus according to a first aspect of the present invention, a focus detection apparatus which detects a defocus state from a phase difference between two output signals, is characterized by comprising a pair of light-receiving means for receiving at least a pair of light beams passing through a lens and outputting signals, the light-receiving means receiving the light beams in a plurality of segmented areas; and area determination means for controlling a size of an area of the light-receiving means segmented into a plurality of areas, on the basis of information of the lens.

According to a second aspect of the present invention, a focus detection apparatus is characterized by comprising a plurality of sensing means, comprising a plurality of photoelectric conversion elements, for receiving light beams passing through a lens to be focus-detected; first accumulation means for accumulating pixel signals obtained by one sensing means of the plurality of sensing means; second accumulation means for accumulating pixel signals obtained by the other sensing means of the plurality of sensing means; first area determination means for setting a size of an area of the one sensing means segmented into a plurality of areas, on the basis of the information of the lens; second area determination means for setting a size of an area of the other sensing means segmented into the same number of areas as that of the one sensing means, on the basis of the information of the lens; first accumulation control means for controlling, for each of the areas, accumulation of pixel signals obtained in each of the areas of the one sensing means by the first accumulation means; second accumulation control means for controlling, for each of the areas, accumulation of pixel signals obtained in each of the areas of the other sensing means by the second accumulation means; and defocus detection means for detecting a defocus state in each of the areas from an accumulated signal in each area which is obtained upon accumulation control by the first accumulation control means and the second accumulation control means.

According to a third aspect of the present invention, a focus detection method of detecting a defocus state from a phase difference between two output signals comprises a light-receiving step of causing a pair of light-receiving means for receiving at least a pair of light beams passing through a lens and outputting signals to receive the light beams in a plurality of segmented areas; and an area determination step of controlling a size of an area of the light-receiving means segmented into a plurality of areas, on the basis of information of the lens.

According to a fourth aspect of the present invention, a focus detection method using sensing means for receiving light beams passing through a lens to be focus-detected, the sensing means comprising a plurality of photoelectric conversion elements, comprises a first accumulation step of accumulating pixel signals obtained by one sensing means of the plurality of sensing means; a second accumulation step of accumulating pixel signals obtained by the other sensing means of the plurality of sensing means; a first area determination step of setting a size of an area of the one sensing means segmented into a plurality of areas, on the basis of the information of the lens; a second area determination step of setting a size of an area of the other sensing means segmented into the same number of areas as that of the one sensing means, on the basis of the information of the lens; a first accumulation control step of controlling, for each of the areas, accumulation of pixel signals obtained in each of the areas of the one sensing means in the first accumulation step; a second accumulation control step of controlling, for each of the areas, accumulation of pixel signals obtained in each of the areas of the other sensing means in the second accumulation step; and a defocus detection step of detecting a defocus state in each of the areas from an accumulated signal in each area which is obtained upon accumulation control in the first accumulation control step and the second accumulation control step.

According to a fifth aspect of the present invention, a focus detection apparatus comprises first to nth pairs of line sensors adapted to perform distance measurement in first to nth specific areas; first to nth pairs of accumulation means for accumulating outputs of pixels in the first to nth pairs of line sensors; first to nth pairs of accumulation control means for stopping accumulation before accumulation amounts in the first to nth pairs of accumulation means are saturated; first to nth pairs of accumulation time measuring means for measuring accumulation times in the first to nth pairs of accumulation means; and calculation means for calculating distance data to an object to be photographed from outputs of pixels accumulated by the first to nth pairs of accumulation means, characterized in that in addition to a case in which the calculation means obtains distance data by using outputs from mth (1=m=n) pair of line sensor selected in advance, after an output from a pair of line sensors different from the mth line pair of sensors is converted into an output which is obtained when an accumulation time measured by the accumulation time measuring means corresponding to the pair of line sensors is set to an arbitrary predetermined time, the calculation means calculates distance data by using the output from the pair of line sensors after conversion.

According to a sixth aspect of the present invention, a focus detection apparatus comprises first to nth pairs of line sensors adapted to perform distance measurement in first to nth specific areas; first to nth pairs of accumulation means for accumulating outputs of pixels in the first to nth pairs of line sensors; first to nth pairs of accumulation control means for stopping accumulation before accumulation amounts in the first to nth pairs of accumulation means are saturated; and calculation means for calculating distance data to an object to be photographed from outputs of pixels accumulated by the first to nth pairs of accumulation means, characterized in that in addition to a case in which when (m−i)th to (m+i)th pairs of line sensors (1=m=n, i<m, i<n−m) selected in advance simultaneously start accumulation and mth accumulation control means stop accumulation by mth pair of line sensors, accumulations by the (m−i)th to (m+i)th pairs of line sensors are stopped, and the calculation means obtains distance data by using outputs from the mth pair of line sensors, the calculation means calculates distance data by using outputs from the (m−i)th to (m+i)th pairs of line sensors.

According to a seventh aspect of the present invention, a focus detection apparatus comprises first to nth pairs of line sensors adapted to perform distance measurement in first to nth specific areas; first to nth pairs of accumulation means for accumulating outputs of pixels in the first to nth pairs of line sensors; first to nth pairs of accumulation control means for stopping accumulation before accumulation amounts in the first to nth pairs of accumulation means are saturated; and calculation means for calculating distance data to an object to be photographed from outputs of pixels accumulated by the first to nth pairs of accumulation means, characterized in that in addition to a case in which when (m−i)th to (m+i)th pairs of line sensors (1=m=n, i<m, i<n−m) selected in advance simultaneously start accumulation and any one of (m−i)th to (m+i)th pairs of accumulation control means stops accumulation by line sensors corresponding to the accumulation control means, accumulations by the (m−i)th to (m+i)th pairs of line sensors are stopped, and the calculation means obtains distance data by using outputs from the mth pair of line sensors, the calculation means calculates distance data by using outputs from the (m−i)th to (m+i)th pairs of line sensors.

According to an eighth aspect of the present invention, a focus detection apparatus comprises a plurality of line sensors; and calculation means for, when a distance measurement result obtained by a predetermined line sensor of the plurality of line sensors is not a desired result, converting each distance measurement data such that accumulation times in the plurality of line sensors are set to the same accumulation time, and calculating distance information upon enlarging a calculation range to an area other than the predetermined line sensor.

According to a ninth aspect of the present invention, a focus detection apparatus comprises a plurality of line sensors; and calculation means for controlling accumulation times in the plurality of line sensors so as to equalize the accumulation times, and when a distance measurement result obtained by the predetermined line sensor of the plurality of line sensors is not a desired result, calculating distance information upon enlarging a calculation range to an area other than the predetermined line sensor.

According to a 10th aspect of the present invention, a focus detection method using first to nth pairs of line sensors which perform distance measurement in first to nth specific areas, is characterized in that in addition to a case in which distance data is obtained by using outputs from mth (1=m=n) pair of line sensors selected in advance, after an output from a pair of line sensors different from the mth pair of line sensors is converted into an output which is obtained when an accumulation time output from the pair of line sensors is set to an arbitrary predetermined time, distance data is calculated by using the output from the pair of line sensors after conversion.

According to a 11th aspect of the present invention, a focus detection method using first to nth pairs of line sensors which perform distance measurement in first to nth specific areas, characterized in that in addition to a case in which when (m−i)th to (m+i)th pairs of line sensors (1=m=n, i<m, i<n−m) selected in advance simultaneously start accumulation and accumulations by mth pair of line sensors is stopped, accumulations by the (m−i)th to (m+i)th pairs of line sensors are stopped, and distance data is obtained by using outputs from the mth pair of line sensors, distance data is calculated by using outputs from the (m−i)th to (m+i)th pairs of line sensors.

According to a 12th aspect of the present invention, a focus detection method using first to nth pairs of line sensors which perform distance measurement in first to nth specific areas, is characterized in that in addition to a case in which (m−i)th to (m+i)th pairs of line sensors (1=m=n, i<m, i<n−m) selected in advance simultaneously start accumulation, accumulations by the (m−i)th to (m+i)th pairs of line sensors are simultaneously stopped, and distance data is obtained by using outputs from the mth pair of line sensors, distance data is calculated by using outputs from the (m−i)th to (m+i)th pairs of line sensors.

According to a 13th aspect of the present invention, a focus detection method is characterized in that when a distance measurement result obtained by a predetermined line sensor of a plurality of line sensors is not a desired result, distance measurement data is converted such that accumulation times in the plurality of line sensors are set to the same accumulation time, and distance information is calculated upon enlarging a calculation range to an area other than the predetermined line sensor.

According to a 14th aspect of the present invention, a focus detection method characterized in that accumulation times in a plurality of line sensors are controlled so as to equalize the accumulation times, and when a distance measurement result obtained by the predetermined line sensor of the plurality of line sensors is not a desired result, distance information is calculated upon enlarging a calculation range to an area other than the predetermined line sensor.

According to a 15th aspect of the present invention, an optical device is characterized by comprising the focus detection apparatus defined in any one of the 1st, 2nd, 5th, and 9th to 14th aspects.

Other objects and advantages besides those discussed above shall be apparent to those skilled in the art from the description of a preferred embodiment of the invention which follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF DRAWINGS

FIGS. 12A and 12B are views showing a method of segmenting an accumulation control area in the sensor array according to the first embodiment of the present invention;

FIG. 17 is a flowchart for explaining the operation of a focus detection apparatus according to the second embodiment of the present invention;

FIG. 23 is a flowchart showing the operation of the focus detection apparatus according to the third embodiment;

FIGS. 24A to 24D are views each showing processing contents corresponding to an image waveform in a large defocus state.

BEST MODE FOR CARRYING OUT THE INVENTION

The embodiments of the present invention will be described in detail below with reference to the accompanying drawings.

First Embodiment

Figure 1:
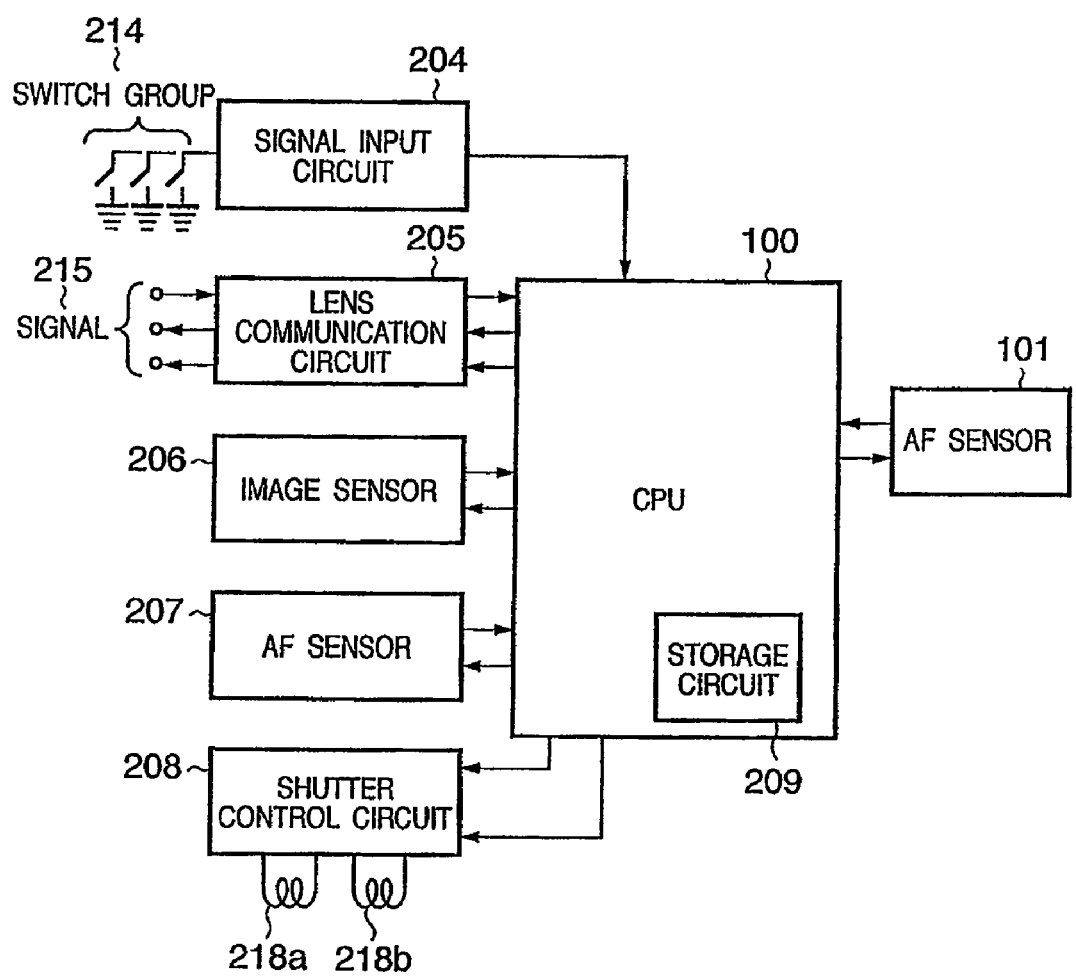
FIG. 1 is a block diagram showing the circuit arrangement of a camera according to the first embodiment of the present invention.

FIG. 1 is a block diagram showing the circuit arrangement of a camera according to the first embodiment of the present invention. Referring to FIG. 1, a signal input circuit 204 for detecting a switch group 214 for various kinds of operations of the camera, an image sensor 206, an AF sensor 207, a shutter control circuit 208 for controlling shutter magnets 218a and 218b, and an AF sensor 101 are connected to a camera microcomputer (to be referred to as a CPU hereinafter) 100. The CPU 100 transmits a signal 215 to a photographing lens (to be described later) through a lens communication circuit 205 to perform control for a focus position and a stop. The operation of the camera is determined by the setting of the switch group 214.

The AF sensor 101 comprises a pair of line sensors. The CPU 100 controls the AF sensor 101 to detect a defocus amount from the contrast distribution of an object to be photographed which is obtained by the line sensors, thereby controlling the focus position of the photographing lens. In addition, the CPU 100 detects the brightness of the object by controlling the AF sensor 207, and determines the aperture value and shutter speed of the photographing lens. The CPU 100 then controls the aperture value on the photographing lens side through the lens communication circuit 205, and controls the shutter speed by controlling the energization times of the shutter magnets 218a and 218b through the shutter control circuit 208. Furthermore, the CPU 100 performs photographing operation by controlling the image sensor 206.

The CPU 100 incorporates a storage circuit 209 including a ROM which stores programs for controlling the camera operation, a RAM for storing variables, and an EEPROM (electrically erasable programmable read-only memory) for storing various parameters, and the like.

A configurational relationship in the optical system of the camera will be described next with reference to FIG. 2.

Most of a light beam from an object to be photographed which is incident through a photographing lens 300 is reflected above by a quick return mirror 305 and is formed into an image on a finder screen 303. The user of the camera observes this image through a penta prism 301 and an eyepiece 302. Part of the photographing light beam is transmitted through the quick return mirror 305 and is deflected downward by a sub-mirror 306 located behind the quick return mirror 305. This light beam is formed into an image on the AF sensor 101 through a field mask 307, field lens 311, stop 308, and secondary imaging lens 309. By processing an image signal obtained by photoelectrically converting this image, the focus state of the photographing lens 300 can be detected. At the time of photography, the quick return mirror 305 flips up, and the entire light beam is formed into an image on the image sensor 206, thereby exposing an object image.

Figure 2:
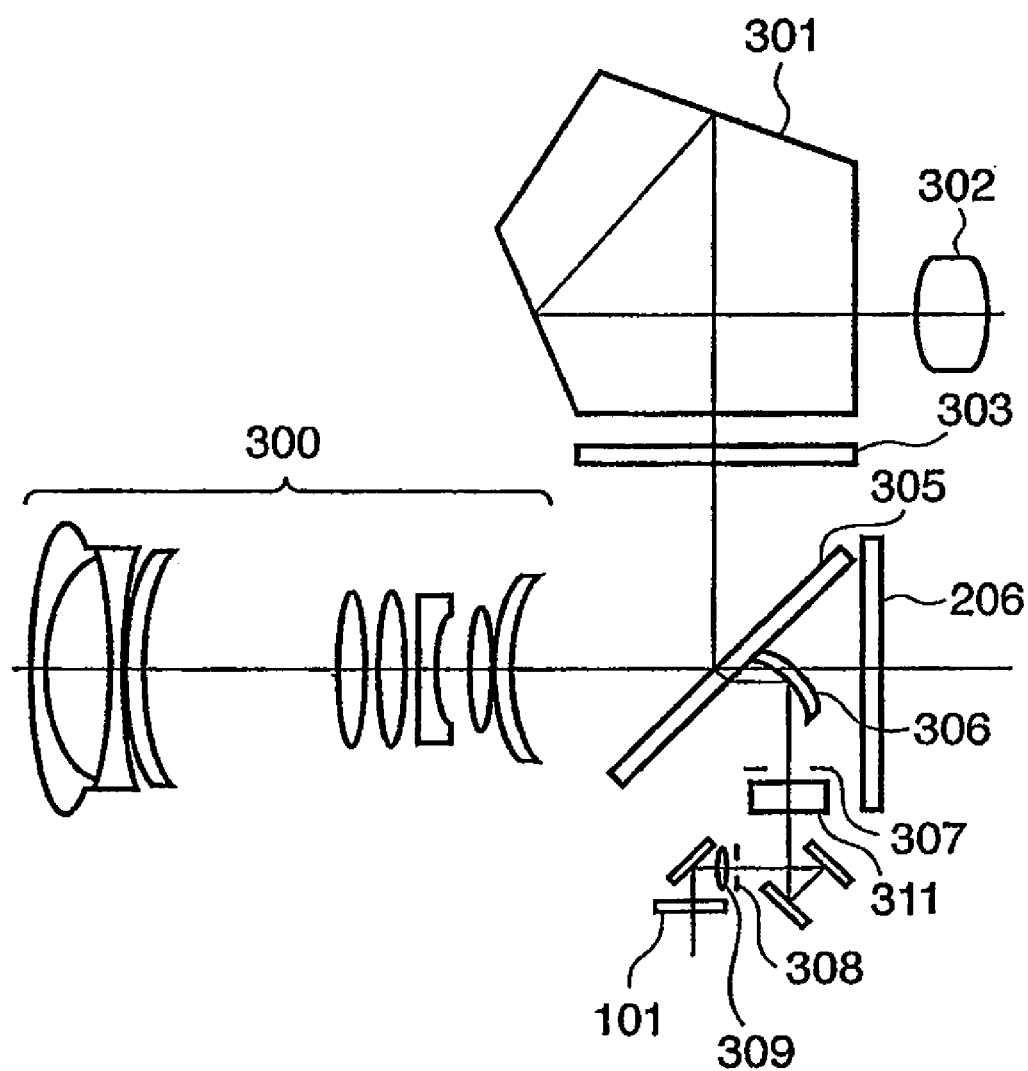
FIG. 2 is a view showing the arrangement of the optical system of the camera according to the first embodiment of the present invention.

The focus detection scheme used in the focus detection apparatus according to the first embodiment (comprising the components ranging from the field mask 307 to the secondary imaging lens 309 in FIG. 2 and the AF sensor 101) is a known phase difference detection scheme, which can detect the focus states of a plurality of different areas in a frame.

Figure 3:
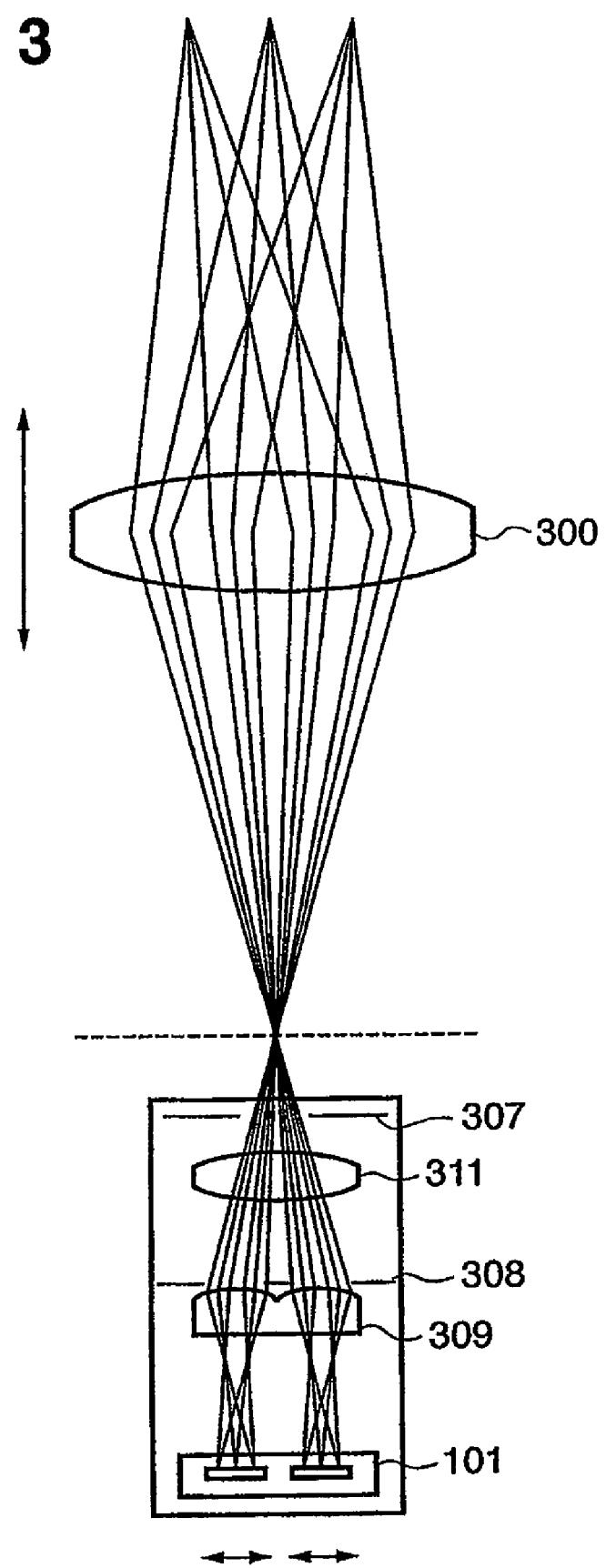
FIG. 3 is a view showing the optical configuration of a focus detection apparatus based on a phase difference scheme incorporated in the camera according to the first embodiment of the present invention.

FIG. 3 shows the detailed arrangement of an optical system associated with focus detection. A light beam from the object which has passed through the photographing lens 300 is reflected by the sub-mirror 306 (see FIG. 2) and is temporarily formed into an image near the field mask 307 located on a plane conjugate to an image capturing plane. FIG. 3 shows the optical path of light reflected and folded by the sub-mirror 306. The field mask 307 is a member for blocking unnecessary light other than that from the focus detection area (to be also referred to as a distance measurement point hereinafter) within a frame.

The field lens 311 has the effect of imaging each aperture portion of the stop 308 near the exit pupil of the photographing lens 300. The secondary imaging lens 309 is placed behind the stop 308, and comprises a pair of lenses, each of which corresponds to each aperture portion of the stop 308. Each light beam passing through the field mask 307, field lens 311, stop 308, and secondary imaging lens 309 is formed into an image on a line sensor (sensor array) on the AF sensor 101. The line sensors in the AF sensor 101 are configured to also form light beams from different objects in a photographing frame into images.

The positional relationship between the arrangement of line sensors in the AF sensor 101 and distance measurement points in a photographing frame will be described with reference to FIGS. 4 and 5.

Figure 4:
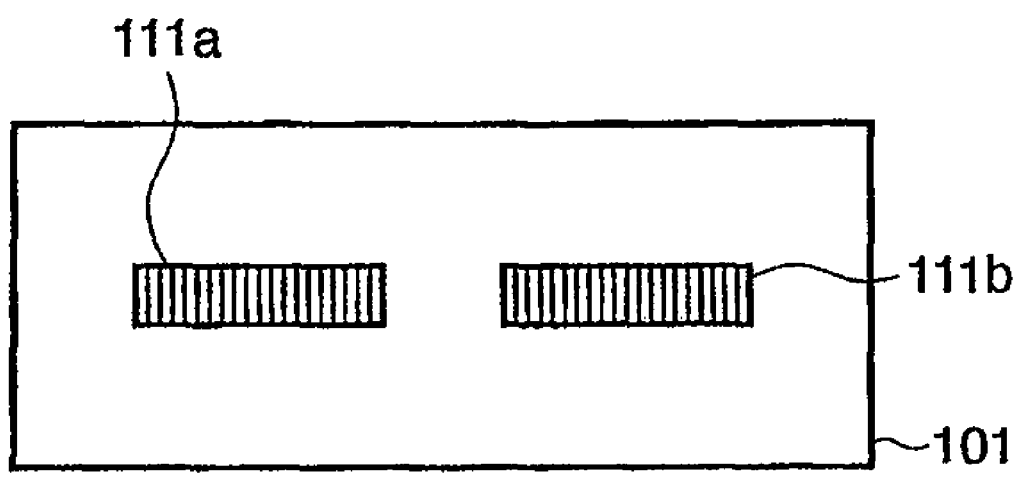
FIG. 4 is a view showing the sensor array (line sensors) of an AF sensor based on the phase difference scheme according to the first embodiment of the present invention.

FIG. 4 is a view showing the arrangement of line sensors in the AF sensor 101. Line sensors 111a and 111b formed in the shape of a pair of lines are arranged in the AF sensor 101.

Figure 5:
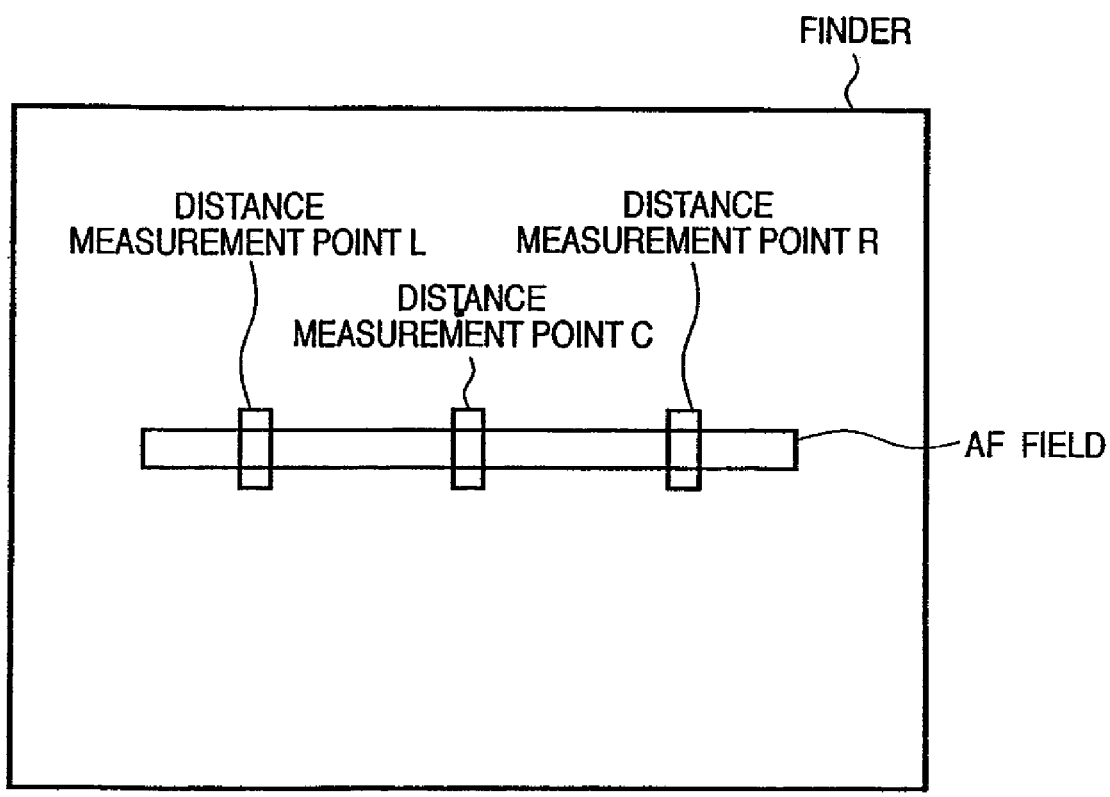
FIG. 5 is a view showing the positional relationship between distance measurement points and an AF field according to the first embodiment of the present invention.

FIG. 5 is a view showing the arrangement of distance measurement points displayed in a finder, and the AF field formed by the line sensors 111a and 11b on the AF sensor 101. Three distance measurement points, namely distance measurement points L, C, and R, are arranged on the AF field. The focuses of three different objects corresponding to the respective distance measurement points can be detected.

Figure 6:
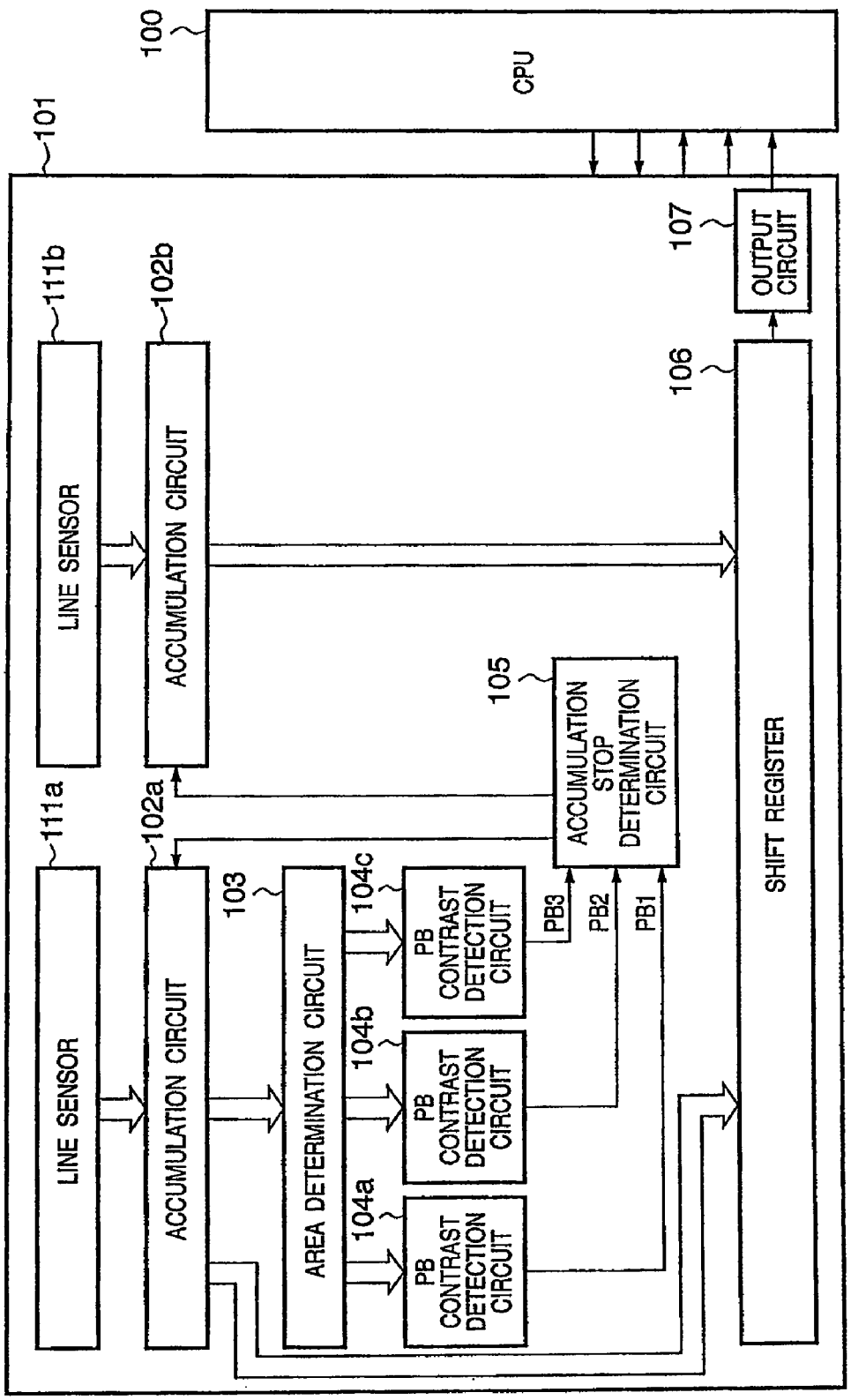
FIG. 6 is a block diagram showing the arrangement of the AF sensor according to the first embodiment of the present invention.

The detailed circuit arrangement of the AF sensor 101 will be described with reference to the block diagram of FIG. 6.

The object image formed by the secondary imaging lens 309 is photoelectrically converted by the line sensors 111a and 111b. The line sensors 111a and 111b are comprised of a plurality of pixels arranged in a line. Signals photoelectrically converted into voltages by the respective pixels are accumulated in accumulation circuits 102a and 102b. An area determination circuit 103 has a function of segmenting the signals accumulated in the accumulation circuit 102a into a maximum of three areas, and distributes the accumulated signals in the respective areas to PB contrast detection circuits 104a, 104b, and 104c.

The PB contrast detection circuits 104a, 104b, and 104c each detect the largest signal (to be referred to as a Peak signal hereinafter) and the smallest signal (to be referred to as a Bottom signal hereinafter) in the range selected by the area determination circuit 103, and outputs a differential signal (to be referred to as a PB signal hereinafter) between the Peak signal and the Bottom signal to a accumulation stop determination circuit 105. In this case, the PB signals detected by the PB contrast detection circuits 104a, 104b, and 104c are respectively denoted by PB1, PB2, and PB3.

The accumulation stop determination circuit 105 compares the PB signals PB1, PB2, and PB3 with a target value. When the PB signals exceed the target value, the accumulation stop determination circuit 105 outputs accumulation stop signals to the accumulation circuits 102a and 102b to stop the accumulation of pixels in the ranges selected by the area determination circuit 103. When accumulation is stopped in any area, the accumulation stop determination circuit 105 outputs an accumulation end signal and area information corresponding to the end of accumulation to the CPU 100. The pixel signals accumulated in the accumulation circuits 102a and 102b are output as pixel signals each corresponding to one pixel to an output circuit 107 as the CPU 100 drives a shift register 106. The output circuit 107 performs processing, e.g., amplifying the pixel signals, and outputs the resultant data to an A/D converter (not shown) in the CPU 100.

A case wherein the line sensors 111a and 111b are segmented into three areas will be described below with reference to FIGS. 7 and 8.

Figure 7:
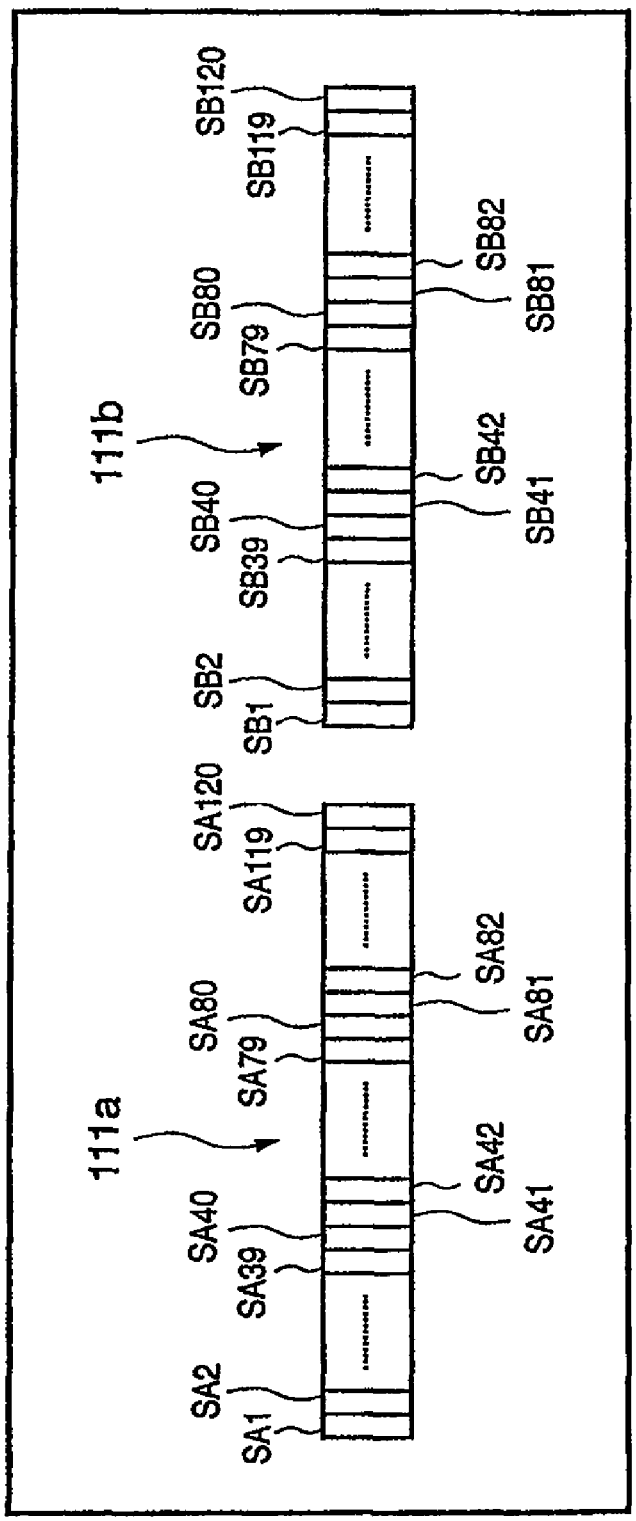
FIG. 7 is a view showing an example of the arrangement of the pixels of the AF sensor according to the first embodiment of the present invention.

Referring to FIG. 7, each of the line sensors 111a and 111b is comprised of 120 pixels, and accumulated signals corresponding to the first pixel and the nth pixel in the line sensor 111a are denoted by reference symbols SA1 and SAn, respectively. In addition, accumulated signals corresponding to the first pixel and nth pixel in the line sensor 111b are denoted by reference symbols SB1 and SBn, respectively.

In this case, the area determination circuit 103 selects (distributes) areas such that pixel signals in the range of SA1 to SA40 are input to the PB contrast detection circuit 104a, the accumulated signals in the range of SA41 to SA80 are input to the PB contrast detection circuit 104*b*, and the accumulated signals in the range of SA81 to SA120 are input to the PB contrast detection circuit 104*c*.

Figure 8:
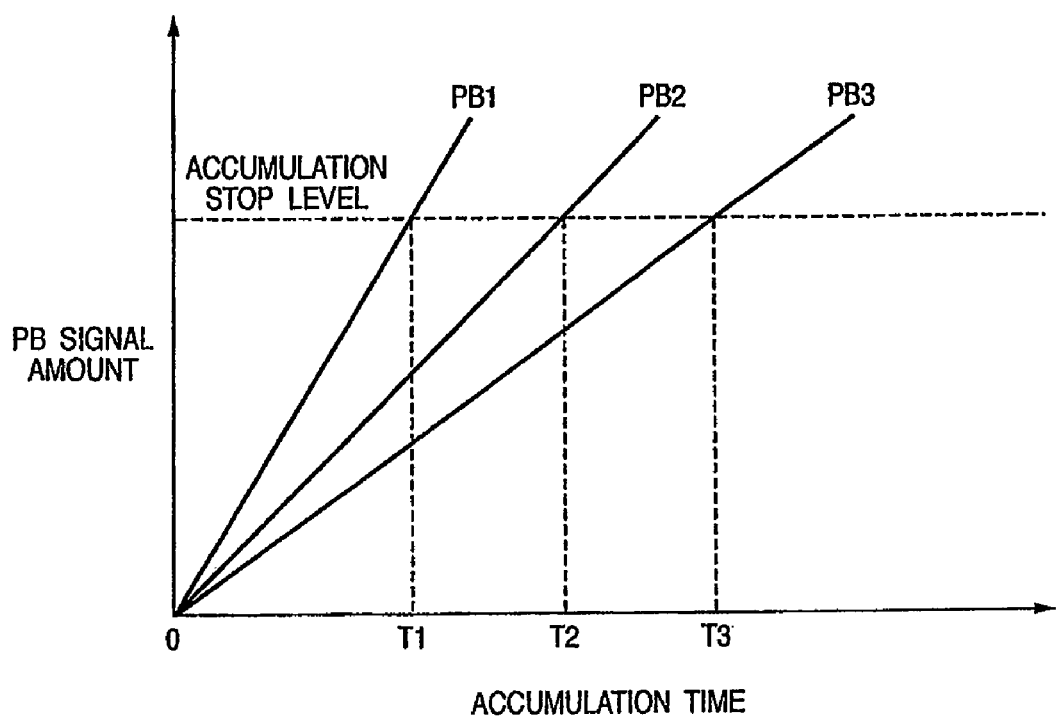
FIG. 8 is a graph for explaining PB signals and a accumulation time control method according to the first embodiment of the present invention.

FIG. 8 is a graph showing the relationship between the signal amounts of the PB signals PB1, PB2, and PB3 as output signals from the PB contrast detection circuits 104*a*, 104*b*, and 104*c* and the accumulation time. The accumulation time 0 corresponds to the accumulation start timing. As the time elapses, the PB signal amount increases. The increase rate of the PB signal amount varies depending on the brightness or contrast of an object to be photographed which exists in each area. The accumulation stop determination circuit 105 compares each PB signal with a stop level. Let T1, T2, and T3 be the timings at which the respective PB signals become equal to or more than the stop level. At the timing T1, the accumulation of pixel signals corresponding to the areas SA1 to SA40 and SB1 to SB40, which are input to the PB contrast detection circuit 104*a*, is stopped. At the timing T2, the accumulation of pixel signals corresponding to the areas SA41 to SA80 and SB41 to SB80, which are input to the PB contrast detection circuit 104*b*, is stopped. At the timing T3, the accumulation of pixel signals corresponding to the areas SA81 to SA120 and SB81 to SB120, which are input to the PB contrast detection circuit 104*c*, is stopped.

Optimal accumulation control can be performed in each area by detecting a PB signal representing the contrast of an object image for each segmented area and continuing accumulation until the signal becomes equal to or more than a predetermined level in this manner.

The operation of the focus detection apparatus having the above arrangement will be described in detail with reference to the flowchart of FIG. 9.

Upon receiving a focus detection start signal as the switch group 214 is operated, the CPU 100 starts focus detection operation by the AF sensor 101. First of all, in step S701, the CPU 100 communicates with the photographing lens 300 through the lens communication circuit 205 to detect the maximum defocus amount which can occur in the mounted photographing lens 300 and the current focus lens position. In step S702, the CPU 100 calculates the maximum defocus amount which can occur in focus detection from the information of the maximum defocus amount in the photographing lens 300 and of the focus lens position which are detected in step S701.

Figure 10:
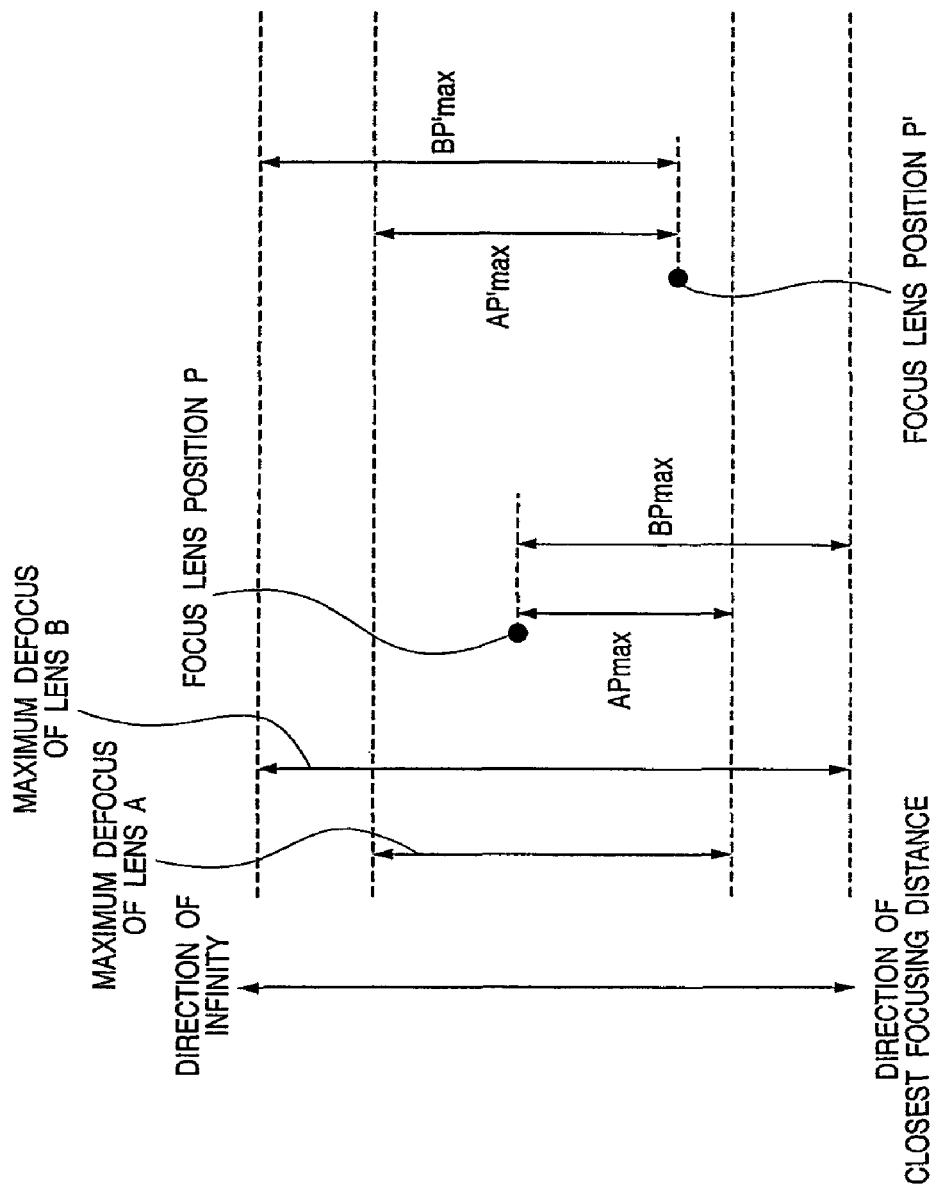
FIG. 10 is a view for explaining a method of detecting a maximum defocus amount from lens information according to the first embodiment of the present invention.

A method of calculating the maximum defocus amount which can occur in focus detection will be described below. FIG. 10 shows the positional relationship between the maximum defocuses of lenses A and B and focus lens positions P and P'. Referring to FIG. 10, the maximum defocus amount of the lens A is smaller than that of the lens B.

The defocus amount which can occur in focus detection is larger one of the difference amount between the focus lens position and the maximum defocus position of the lens (on the infinity side) and the difference amount between the focus lens position and the maximum defocus position (on the closest focusing distance side).

In the case of the lens A, at a focus lens position P, the maximum defocus amount which can occur is a difference amount APmax between the position P and the defocus limit position in the direction of the closest focusing distance. At a focus lens position P', the maximum defocus amount which can occur is a difference amount AP'max between the position P' and the defocus limit position in the direction of infinity.

In the case of the lens B, at the focus lens position P, the maximum defocus amount which can occur is a difference amount BPmax between the position P and the defocus limit position in the direction of the closest focusing distance. At the focus lens position P', the maximum defocus amount which can occur is a difference amount BP'max between the position P' and the defocus limit position in the direction of infinity.

As described above, the maximum defocus amount which can occur varies depending on the type of lens and the focus lens position.

Figure 9:
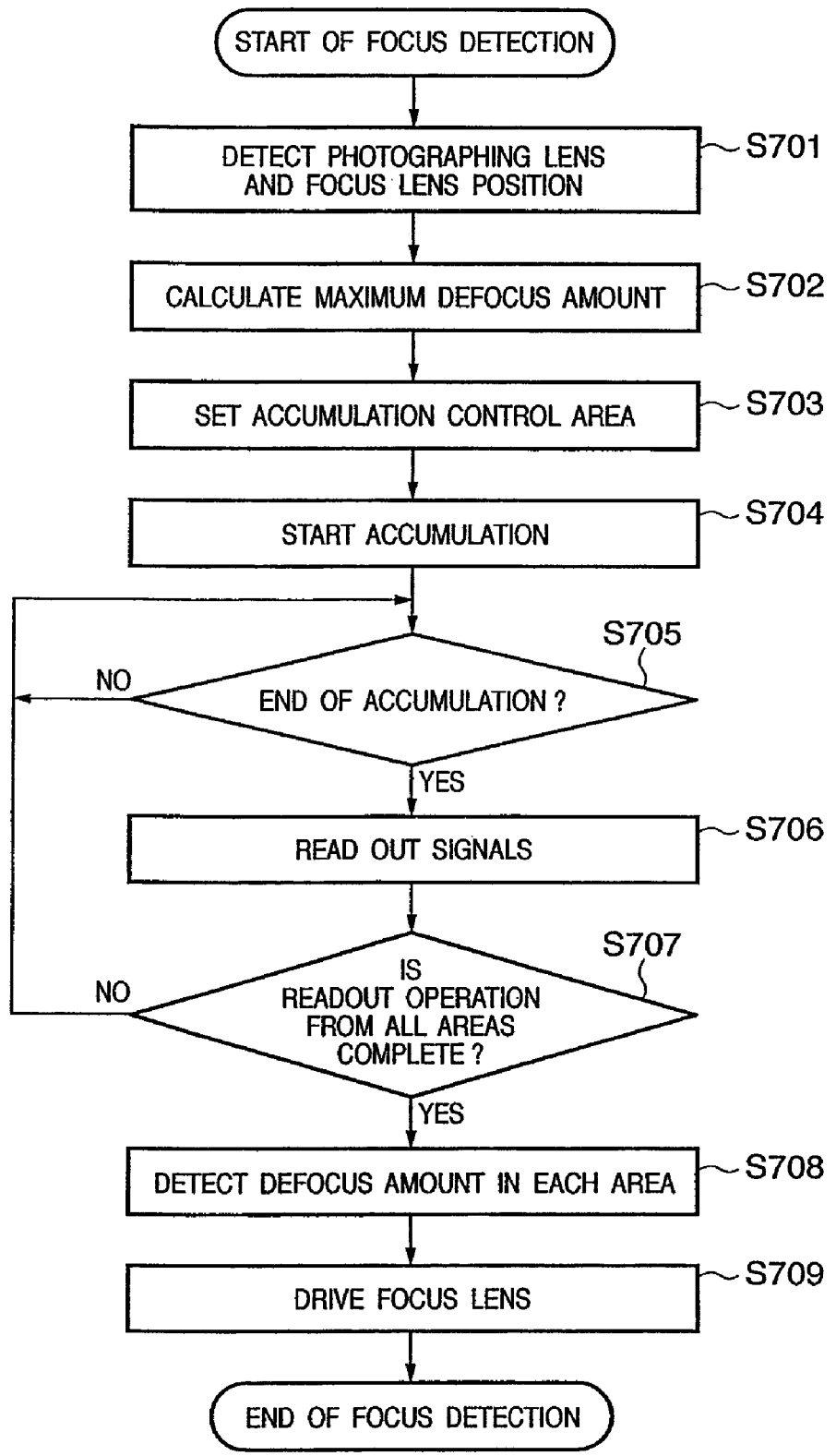
FIG. 9 is a flowchart for explaining the operation of a focus detection apparatus according to the first embodiment of the present invention.

Referring back to the flowchart of FIG. 9, in step S703, the CPU 100 causes the area determination circuit 103 to set accumulation control areas on the basis of the maximum defocus amount which can occur in focus detection, which is calculated in step S702.

A method of setting accumulation control areas will be described with reference to FIGS. 11, 12A, and 12B.

Figure 11:
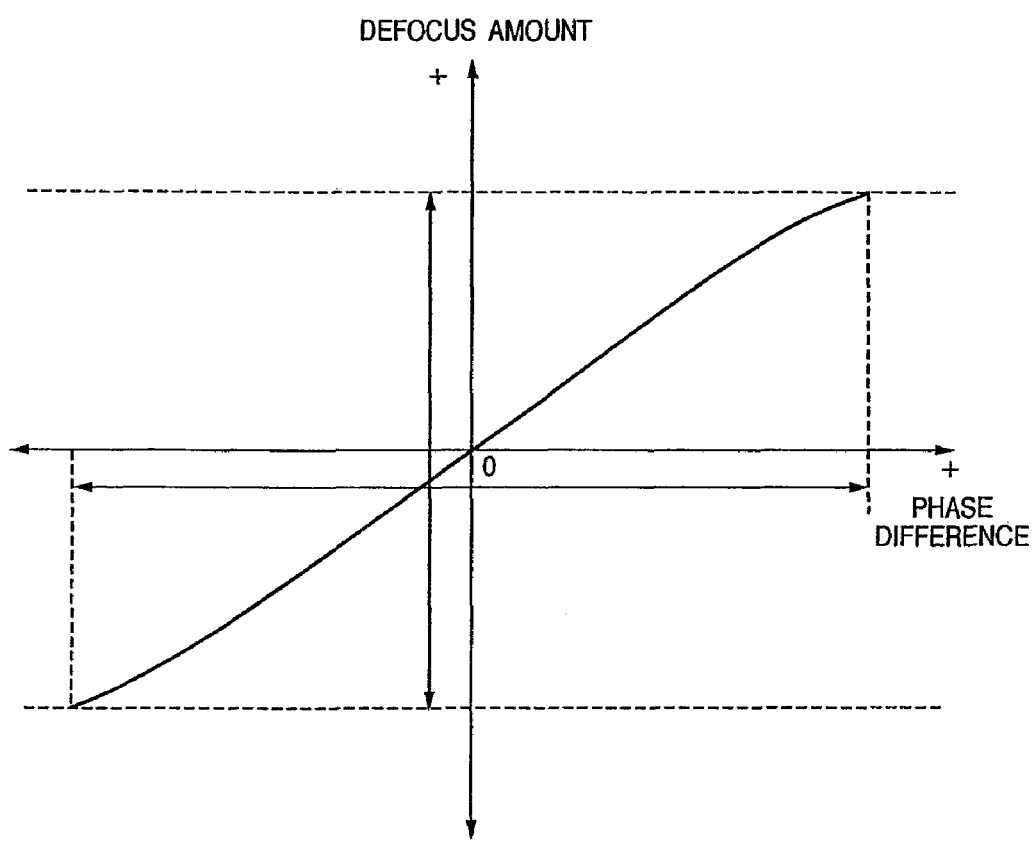
FIG. 11 is a graph showing an example of the relationship between a phase difference and a defocus position according to the first embodiment of the present invention.

FIG. 11 is a graph showing the relationship between the phase difference (shift amount) between the object images obtained by the line sensors 111*a* and 111*b* and the defocus amount. This relationship can be expressed almost linearly, and the gradient of this line is determined by the optical system of the focus detection system. Normally, a defocus amount is calculated from the phase difference between obtained object images. In contrast, the maximum phase difference which can be caused by object images can be calculated from the maximum defocus amount calculated in step S702. If the accumulation control area is smaller than the maximum phase difference, object images fall outside the area at the time of the maximum phase difference, and no phase difference can be detected. Therefore, an accumulation control area needs to have at least a size corresponding to the maximum phase difference amount between object images. In this case, an accumulation control area is determined by adding a predetermined margin to the maximum phase difference.

FIG. 12A shows areas L, C, and R in a case wherein the maximum defocus amount is small, and the accumulation range calculated from the maximum phase difference is ⅓ or less of the length of the sensor array. The areas L, C, and R are obtained by segmenting the sensor array into three equal parts (the area C is limited so as not to be smaller than ⅓ of the length of the sensor array). FIG. 12B shows areas L, C, and R in a case wherein the maximum defocus amount is large, and the accumulation range calculated from the maximum phase difference is larger than ⅓ of the length of the sensor array. The area C is set to be larger than ⅓ of the length of the sensor array in accordance with the accumulation control area calculated from the maximum phase difference, and the portions other than the portion used for the area C are used for the areas L and R. As described above, the area determination circuit 103 distributes pixel signals in the area L to the PB contrast detection circuit 104*a*, pixel signals in the area C to the PB contrast detection circuit 104*b*, and pixel signals in the area R to the PB contrast detection circuit 104*c*.

As described above, areas for which accumulation control is to be performed are determined from information from the photographing lens 300, i.e., the information of the maximum defocus amount and of the current focus lens position.

Referring back to the flowchart of FIG. 9, in step S704, the CPU 100 controls the AF sensor 101, and starts signal accumulation operation by the accumulation circuits 102*a* and 102*b*. In step S705, accumulation stop determination operation is performed for the accumulation control area set in step S703. The CPU 100 detects an accumulation stop signal output from the AF sensor 101. Until an accumulation stop signal is detected, the operation in step S705 is repeated. If an accumulation stop signal is detected, the flow advances to signal readout operation in step S706.

In step S706, readout operation for pixel signals in the area in which accumulation is complete is performed. The CPU 100 controls the AF sensor 101 to sequentially output pixel signals from the area in which accumulation is complete, and A/D-converts the pixel signals by using an A/D converter (not shown) in the CPU 100. The A/D-converted pixel signals are stored in the storage circuit 209. In step S707, it is determined whether accumulation operation is complete in all the areas L, C, and R, and signal readout operation is complete. If the readout operation is complete in all the areas, the flow advances to step S708. If the readout operation is not complete, the flow returns to the accumulation end determination operation in step S705, and similar operation will be subsequently repeated.

When the flow advances to step S708 upon determining that the readout operation for pixel signals from all the areas L, C, and R is complete, correlation calculation is performed on the basis of the respective pixel signals in the areas L, C, and R stored in the storage circuit 209 to calculate defocus amounts in the respective areas. Corresponding focus detection results are obtained at a distance measurement point L in the area L, a distance measurement point C in the area C, and a distance measurement R in the area R. In step S709, the CPU 100 performs focus lens driving control for the photographing lens 300 through the lens communication circuit 205 on the basis of the defocus amounts calculated in step S708, and terminates the series of focus detection operations.

According to the first embodiment described above, an area for which accumulation control is to be performed is determined from not only the maximum defocus amount which can occur in the photographing lens 300 but also the information of the focus lens position at the corresponding time, and a defocus amount is detected on the basis of pixel signals obtained in the determined area. This makes it possible to eliminate the necessity to perform accumulation control again when an accumulation control area is changed as in the prior art, thereby shorting the focus detection time.

Applying the range of an accumulation area determined in the above manner to the distance measurement area of the middle portion and using the remaining pixel ranges as peripheral distance measurement areas can prevent the detection areas from overlapping and allows focus detection without unnecessarily enlarging the accumulation control range. This can therefore prevent a focus detection error (far/near focus contention) due to signals from the background of an object to be photographed. Note that a far/near focus contention is a phenomenon in which a plurality of objects to be photographed are located at different positions in a distance measurement range. In addition, focus detection can be performed for a plurality of objects to be photographed. That is, this embodiment can detect not only a large defocus at one point (the area C in the middle of the frame) but also defocuses at peripheral distance measurement points (the areas L and R). Applying the range of the accumulation area determined in the above manner to the distance measurement area of the middle portion, when the remaining pixel ranges are smaller than a predetermined range, focus detection can be performed only at the distance measurement area of the middle portion. That is, defocus detection at the peripheral distance measurement points (the areas L and R) is not performed.

Second Embodiment

In the focus detection apparatus according to the first embodiment described above, when the area C is enlarged, the areas L and R become narrow. As a result, the detection range of defocus amounts becomes narrow. A technique for solving this problem will be described below as the second embodiment of the present invention.

Figure 13:
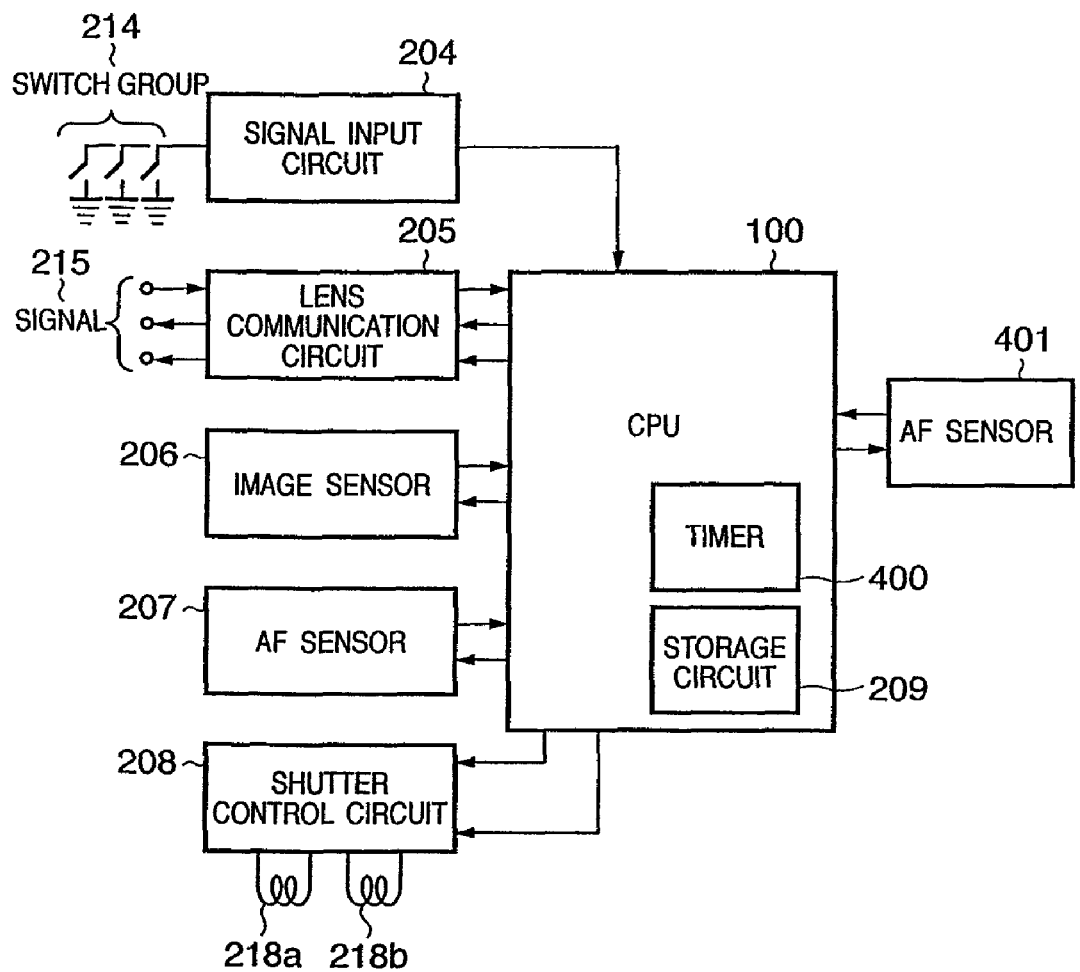
FIG. 13 is a block diagram showing the circuit arrangement of a camera according to the second embodiment of the present invention.

FIG. 13 is a block diagram showing the arrangement of a camera according to the second embodiment of the present invention. The same reference numerals as in FIG. 1 denote the same parts in FIG. 13.

An AF sensor 401 comprises two pairs of line sensors. A CPU 100 incorporates a timer 400 for measuring the accumulation time in the AF sensor 401. Other arrangements are the same as those shown in FIG. 1, and hence a description thereof will be omitted.

The relationship between the line sensors on the AF sensor 401 and distance measurement points in a photographing frame will be described with reference to FIGS. 14 and 15.

Figure 14:
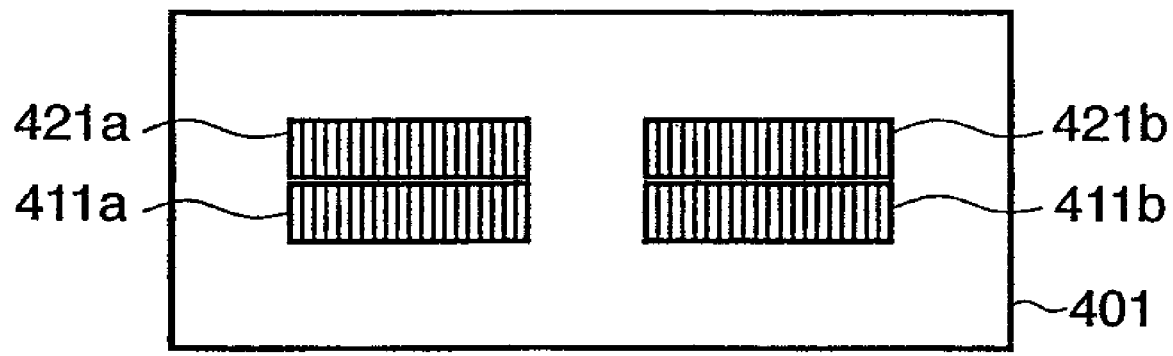
FIG. 14 is a view showing the sensor array of an AF sensor based on the phase difference scheme according to the second embodiment of the present invention.

FIG. 14 is a view showing the arrangement of the line sensors in the AF sensor 401. The AF sensor 401 has line sensors 411a and 411b and line sensors 421a and 421b which are formed in the shape of two pairs of lines.

Figure 15:
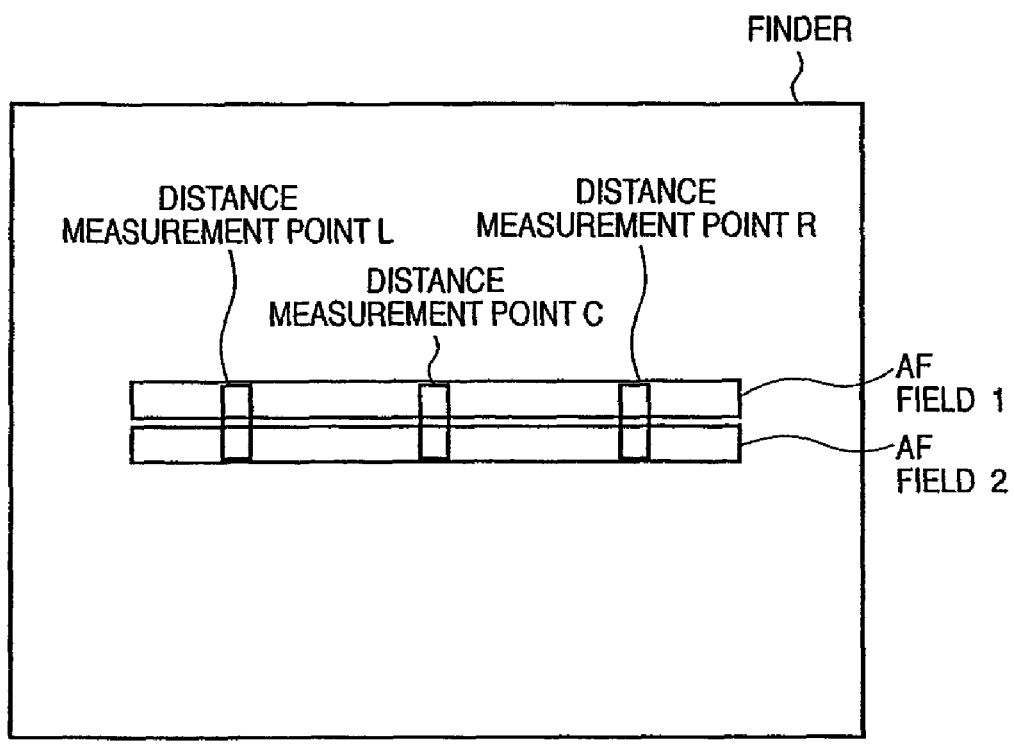
FIG. 15 is a view showing the positional relationship between distance measurement points and AF fields according to the second embodiment of the present invention.

FIG. 15 is a view showing the arrangement of distance measurement points displayed in a finder, the range of AF field 1 formed by the line sensors 411a and 411b, and the range of AF field 2 formed by the line sensors 421a and 421b. Three distance measurement points, namely distance measurement points L, C, and R, are arranged on adjacent AF fields 1 and 2, and focus detection can be performed for three different objects to be photographed which correspond to the respective distance measurement points.

Figure 16:
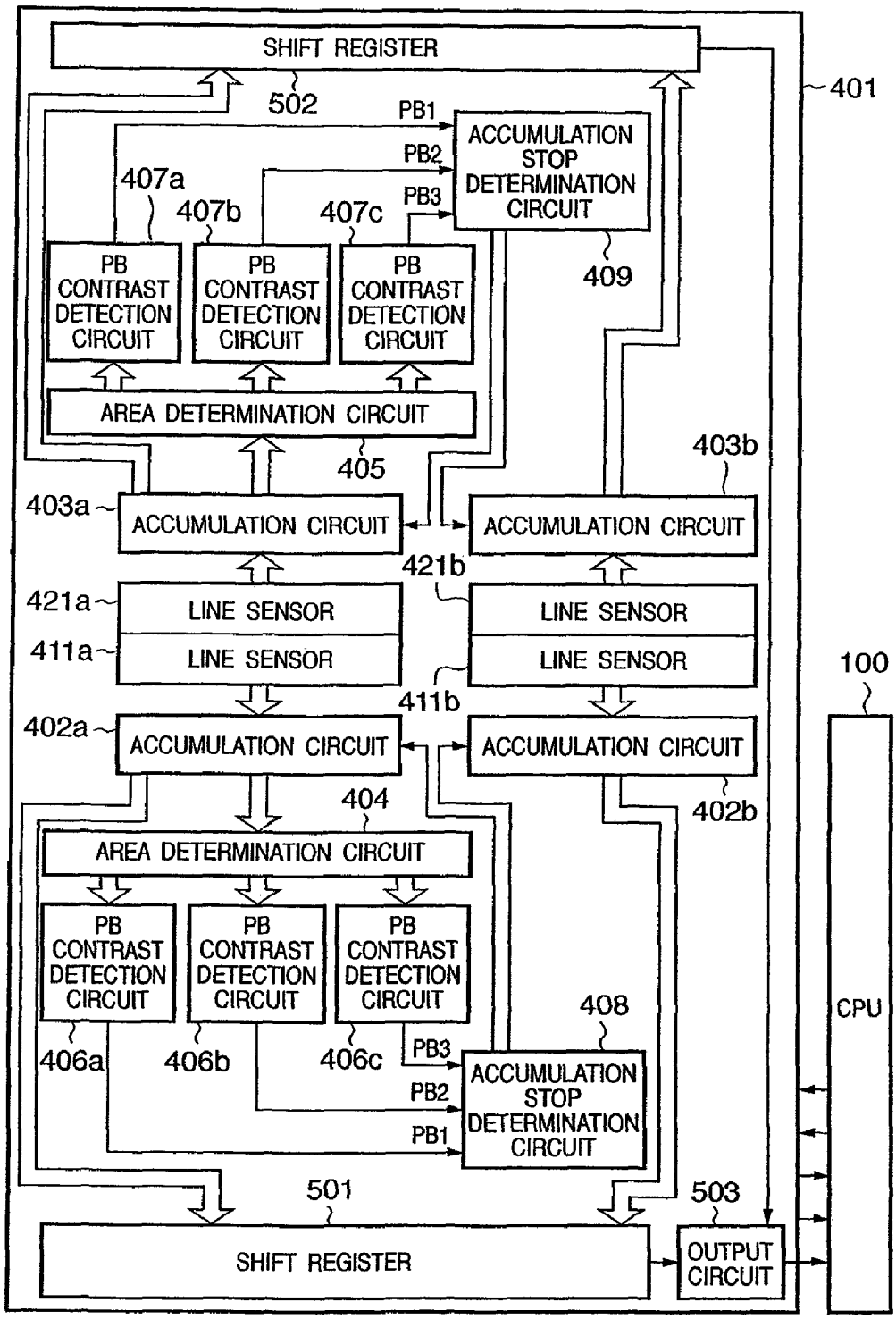
FIG. 16 is a block diagram showing the arrangement of the AF sensor according to the second embodiment of the present invention.

The detailed circuit arrangement of the AF sensor 401 will be described with reference to the block diagram of FIG. 16. An object image formed by a secondary imaging lens 209 is photoelectrically converted by the line sensors 411a and 411b and the line sensors 421a and 421b. The line sensors 411a and 411b are formed by a plurality of pixels in the form of a line, and signals photoelectrically converted into voltages by the respective pixels are accumulated in accumulation circuits 402a and 402b. Likewise, the line sensors 421a and 421b are formed by a plurality of pixels in the form of a line, and signals photoelectrically converted into voltages by the respective pixels are accumulated in accumulation circuits 403a and 403b.

An area determination circuit 404 segments the signals accumulated in the accumulation circuit 402a into a maximum of three areas, and distributes the accumulated signals in the respective ranges to PB contrast detection circuits 406a, 406b, and 406c. An area determination circuit 405 segments the signals accumulated in the accumulation circuit 403a into a maximum of three areas, and distributes the accumulated signals in the respective ranges to PB contrast detection circuits 407a, 407b, and 407c. The PB contrast detection circuits 406a, 406b, and 406c and the PB contrast detection circuits 407a, 407b, and 407c have the same functions as those of the PB contrast detection circuits 104a, 104b, and 104c in FIG. 6.

An accumulation stop determination circuit 408 outputs accumulation stop signals to the accumulation circuits 402a and 402b on the basis of PB signals output from the PB contrast detection circuits 406a, 406b, and 406c. An accumulation stop determination circuit 409 outputs accumulation stop signals to the accumulation circuits 403a and 403b on the basis of PB signals output from the PB contrast detection circuits 407a, 407b, and 407c. The pixel signals accumulated in the accumulation circuits 402a and 402b are output as pixel signals each corresponding to one pixel through an output circuit 503 as the CPU 100 drives a shift register 501. The pixel signals accumulated in the accumulation circuits 403a and 403b are output as pixel signals each corresponding to one pixel through the output circuit 503 as the CPU 100 drives a shift register 502. The output circuit 503 performs processing, e.g., amplifying the pixel signals, and outputs the resultant data to an A/D converter (not shown) in the CPU 100.

The operation of the focus detection apparatus having the above arrangement will be described in detail with reference to the flowchart of FIG. 17.

Upon receiving a focus detection start signal as a switch group 214 is operated, the CPU 100 starts focus detection operation by the AF sensor 401. First of all, in step S801, the CPU 100 communicates with a photographing lens 300 through a lens communication circuit 205 to detect the maximum defocus amount which can occur in the mounted photographing lens 300 and the current focus lens position. In step S802, the CPU 100 calculates the maximum defocus amount which can occur in focus detection from the information of the maximum defocus amount in the photographing lens 300 and of the focus lens position which are detected in step S801. Subsequently, in step S803, the CPU 100 causes the area determination circuits 404 and 405 to set a first accumulation control area on the basis of the maximum defocus amount which can occur in focus detection, which is calculated in step S802.

Figure 18B:
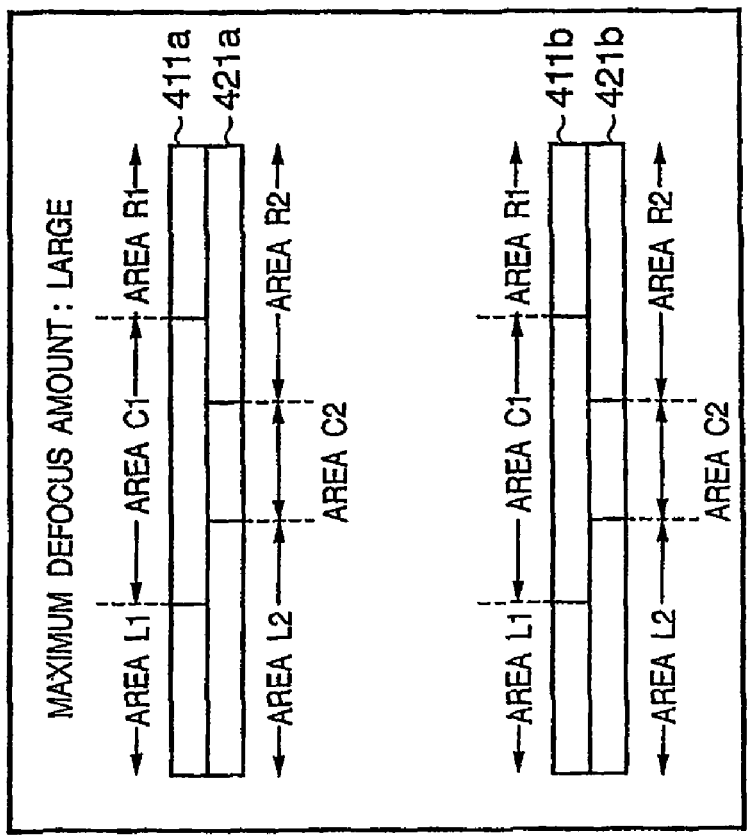
FIGS. 18A and 18B are views showing a method of segmenting an accumulation control area in a sensor array according to the second embodiment of the present invention.
Figure 18A:
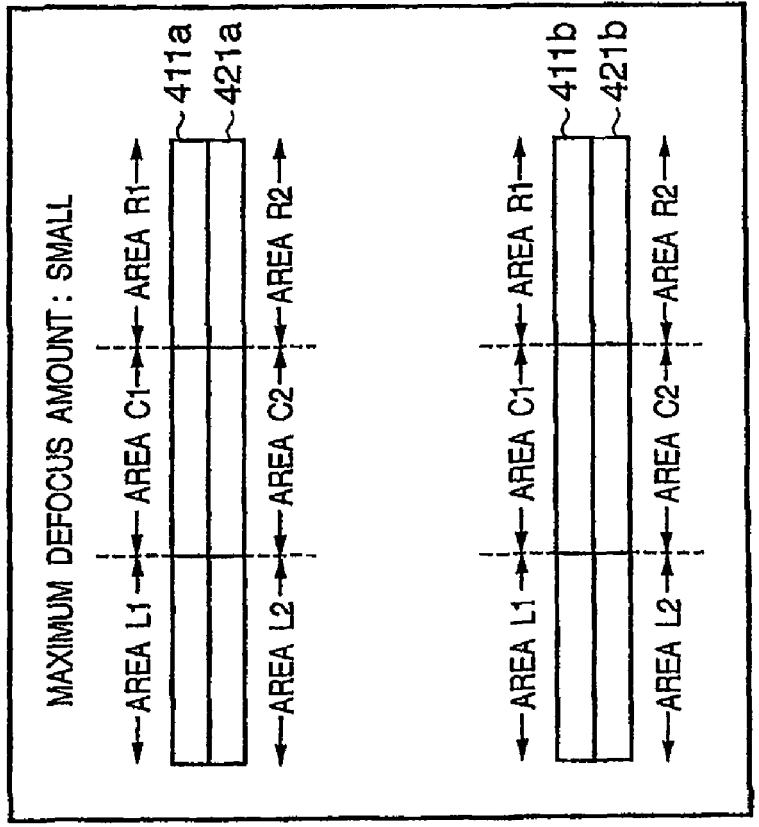

FIG. 18A shows accumulation control areas in a case wherein the maximum defocus amount is small, and the accumulation range calculated from the maximum phase difference is ⅓ or less of the length of the sensor array. Areas L1, C1, and R1 as accumulation control areas of the line sensors 411*a* and 411*b* are obtained by segmenting the line sensors into three equal parts. Areas L2, C2, and R2 as accumulation control areas of the line sensors 421*a* and 421*b* are obtained by segmenting the line sensors into three equal parts. In this case, focus detection can be performed in two accumulation control areas for an object to be photographed at each distance measurement point.

FIG. 18B is a view showing accumulation control areas in a case wherein the maximum defocus amount is large, and the accumulation range calculated from the maximum phase difference is larger than ⅓ of the length of the sensor array. Of the accumulation control areas of the line sensors 411*a* and 411*b*, the area C1 is set to be larger than ⅓ of the length of the sensor array in accordance with the accumulation control area calculated from the maximum phase difference, and the portions other than the portion used for the area C1 are used for the areas L1 and R1.

Of the accumulation control areas of the line sensors 421*a* and 421*b*, the areas L2 and R2 are set to be larger than ⅓ of the length of the sensor array in accordance with the accumulation control area calculated from the maximum phase difference, and the portion other than the portions used for the areas L2 and R2 is used for the area C2. Even if the accumulation control area calculated from the maximum phase difference is large, focus detection can be performed in at least one accumulation control area for an object to be photographed at each distance measurement point.

The area determination circuit 404 distributes the pixel signals in the area L1 to the PB contrast detection circuit 406*a*, the pixel signals in the area C1 to the PB contrast detection circuit 406*b*, and the pixel signals in the area R1 to the PB contrast detection circuit 406*c*. The area determination circuit 405 distributes the pixel signals in the area L2 to the PB contrast detection circuit 407*a*, the pixel signals in the area C2 to the PB contrast detection circuit 407*b*, and the pixel signals in the area R2 to the PB contrast detection circuit 407*c*.

In the above manner, accumulation control areas are determined from the information of the maximum defocus amount in the photographing lens 300 and of the current focus lens position.

Referring back to the flowchart of FIG. 17, in step S804, the CPU 100 controls the AF sensor 401 and starts accumulation operation by the accumulation circuits 402*a* and 402*b* and the accumulation circuits 403*a* and 403*b*. In addition, the timer 400 starts to count an accumulation time. In step S805, the CPU 100 compares the accumulation time counted by the timer 400 with a predetermined time set in advance. If the accumulation time is equal to or less than the predetermined time, the flow advances to step S806. If the accumulation time is longer than the predetermined time, the flow advances to step S807.

When the flow advances to step S806 upon determining that the accumulation time is equal to or less than the predetermined time, accumulation stop determination operation is performed with respect to the accumulation control area set in step S803. The CPU 100 detects an accumulation stop signal output from the AF sensor 401. If an accumulation stop signal is detected, the flow advances to the signal readout operation in step S809. If no accumulation stop signal is detected, the flow returns to step S805 to repeat the same operation as that described above.

If the flow advances to step S807 upon determining that the accumulation time is longer than the predetermined time, the second accumulation control area is set (re-set). In this case, since it is determined in step S805 that the accumulation time is longer than the predetermined time, the object is in a low-brightness state. If the accumulation time is longer than the predetermined time, the focus detection accuracy decreases due to a dark current which is a noise component of a pixel signal. For this reason, as shown in FIG. 18A, an accumulation control area is re-set such that focus detection can always be performed in two accumulation control areas (the areas L1 and L2, the areas C1 and C2, and the areas R1 and R2) for the object.

In next step S808, accumulation stop determination operation is performed with respect to the second accumulation control area re-set in step S807. The CPU 100 detects an accumulation stop signal output from the AF sensor 401, and continues the operation in step S808 until an accumulation stop signal is detected. When an accumulation stop signal is detected afterward, the flow advances to signal readout operation in step S809.

When the flow advances to step S809, pixel signals are read out from the area in which accumulation is complete. The CPU 100 controls the AF sensor 401 to sequentially output pixel signals from the area in which accumulation is complete, and causes an A/D converter (not shown) in the CPU 100 to A/D-convert the pixel signals. The pixel signals which have undergone A/D conversion are stored in a storage circuit 209. In next step S810, it is determined whether accumulation operation is complete in all the areas L1, C1, R1, L2, C2, and R2, and signal readout operation is complete. If the readout operation in all the areas is complete, the flow advances to step S811. If there is still any area in which the readout operation is not complete, the flow returns to step S805 to repeat the same operation as that described above.

When the flow advances to step S811 upon determining that the readout operation in all the areas is complete, correlation calculation is performed on the basis of the respective pixel signals in the respective areas stored in the storage circuit 209, thereby calculating defocus amounts in the respective areas. Corresponding focus detection results are obtained at a distance measurement point L in the areas L1 and L2, a distance measurement point C in the areas C1 and C2, and a distance measurement point R in the areas R1 and R2. When the flow passes through steps S807 and S808, a focus detection result is obtained by performing averaging processing of the focus detection results obtained in two areas. In next step S812, the CPU 100 performs driving control on the focus lens of the photographing lens 300 through the lens communication circuit 205 on the basis of the defocus amount (which always includes the defocus amounts obtained in the areas L2 and R2) calculated in step S811. The CPU 100 then terminates the series of focus detection operations.

According to the second embodiment described above, as in the first embodiment, an area for which accumulation control for each line sensor is to be performed is determined from not only the maximum defocus amount which can occur in the photographing lens 300 but also the information of the focus lens position at the corresponding time, and a defocus amount is detected on the basis of pixel signals obtained in the determined area. This makes it possible to eliminate the necessity to perform accumulation control again when an accumulation control area is changed as in the prior art, thereby shorting the focus detection time. Applying the range of an accumulation area determined in the above manner to the distance measurement area of the middle portion and using the remaining pixel ranges as peripheral distance measurement areas can prevent the detection areas from overlapping and allows focus detection without unnecessarily enlarging the accumulation control range. This can therefore prevent a focus detection error (far/near focus contention) due to signals from the background of an object to be photographed.

In addition, the size (range) of an accumulation control area determined in the above manner is applied to the distance measurement area of the middle portion of the line sensors 411a and 411b, and is applied to the distance measurement areas of the peripheral portions of the line sensors 421a and 421b. Even if the accumulation control area is enlarged, therefore, focus detection for a plurality of objects to be photographed can be properly performed without overlapping of areas.

If the accumulation time prolongs due to the low-brightness state of the object, and the focus detection accuracy decreases due to a dark current as a noise component of a pixel signal, accumulation control areas are switched such that focus detection can always be performed in two areas in the same range (the areas L1 and L2, the areas C1 and C2, and the areas R1 and R2) for the object, as shown in FIG. 18A. The detection accuracy can be improved by performing averaging processing or the like of focus detection results obtained in two areas.

Third Embodiment

Figure 19:
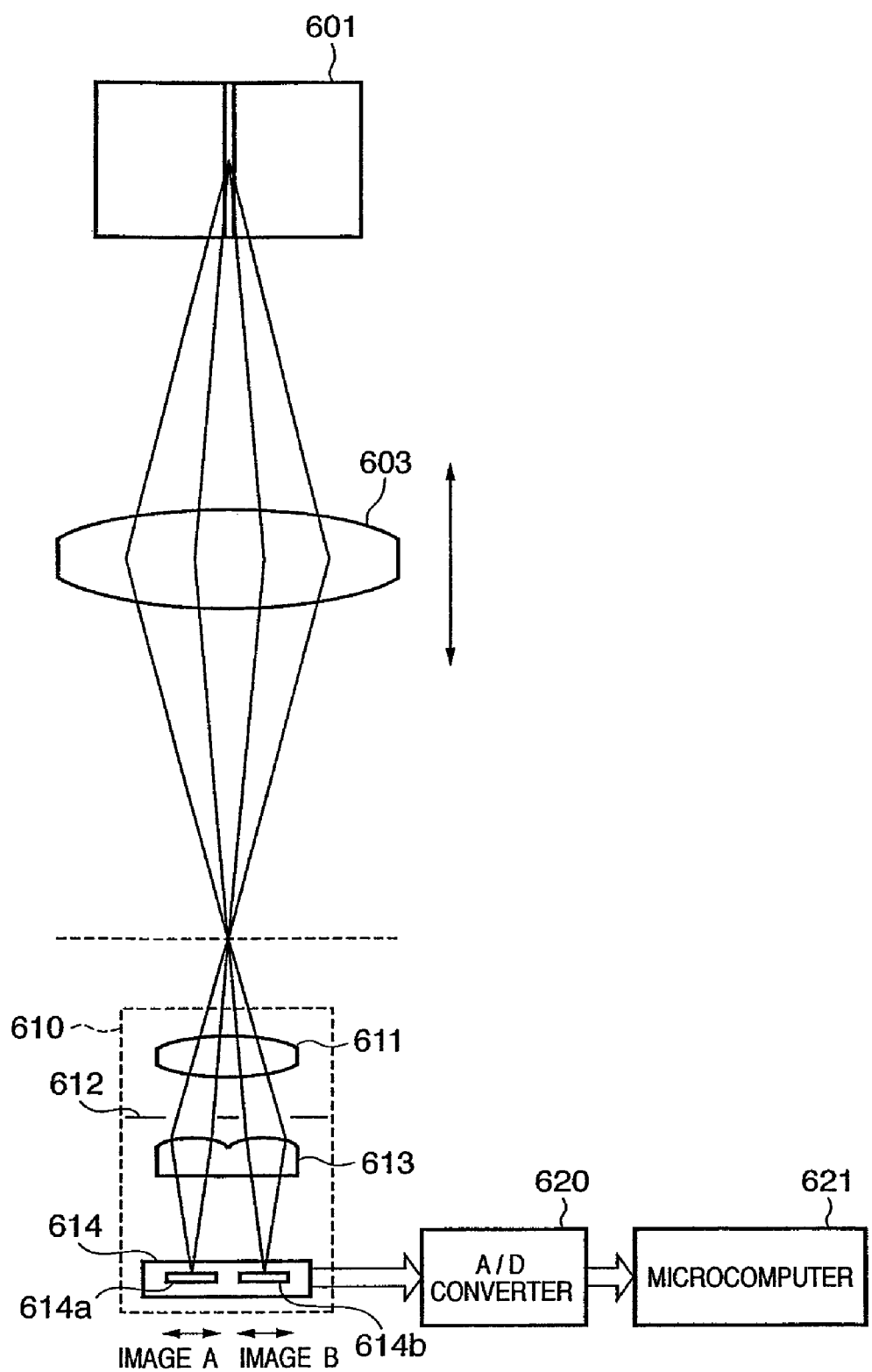
FIG. 19 is a view showing a distance measurement principle using a focus detection apparatus according to the third embodiment of the present invention.

The third embodiment of the present invention will be described next. FIG. 19 is a view showing a distance measurement principle using a focus detection apparatus according to the third embodiment of the present invention.

In the third embodiment, a photographing lens 603 is placed in front of a distance measurement unit 610. The focus state can be changed by changing the position of the photographing lens 603 between an object 601 to be photographed and the distance measurement unit 610, and more specifically, moving the photographing lens 603 in the vertical direction in FIG. 19 (the direction indicated by the arrow in FIG. 19). In the case shown in FIG. 19, a one-bar chart plate (a chart plate with one bar) is used as the object 601.

The distance measurement unit 610 is provided with a field lens 611, a stop 612, a secondary imaging spectacle lens 613 having two lenses combined, and a light-receiving sensor 614. Unnecessary light beams of light beams passing through an exit pupil of the photographing lens 603 are cut off by the stop 612. The resultant light beams are then secondarily formed into images on the light-receiving sensor 614 through the secondary imaging spectacle lens 613. The light-receiving sensor 614 is provided with two line sensor groups 614a and 614b. The left and right images (to be also referred to as images A and B, respectively, hereinafter) secondarily formed by the spectacle lens 613 are received by the line sensor groups 614a and 614b. The images are then output as line sensor pixel outputs through various processing circuits (not shown in FIG. 19).

Line sensor pixel outputs from the light-receiving sensor 614 are converted into digital signals by an A/D converter 620. A microcomputer 621 then performs correlation calculation between images A and B to detect the defocus state of the object 601 (or distance information).

Figure 20:
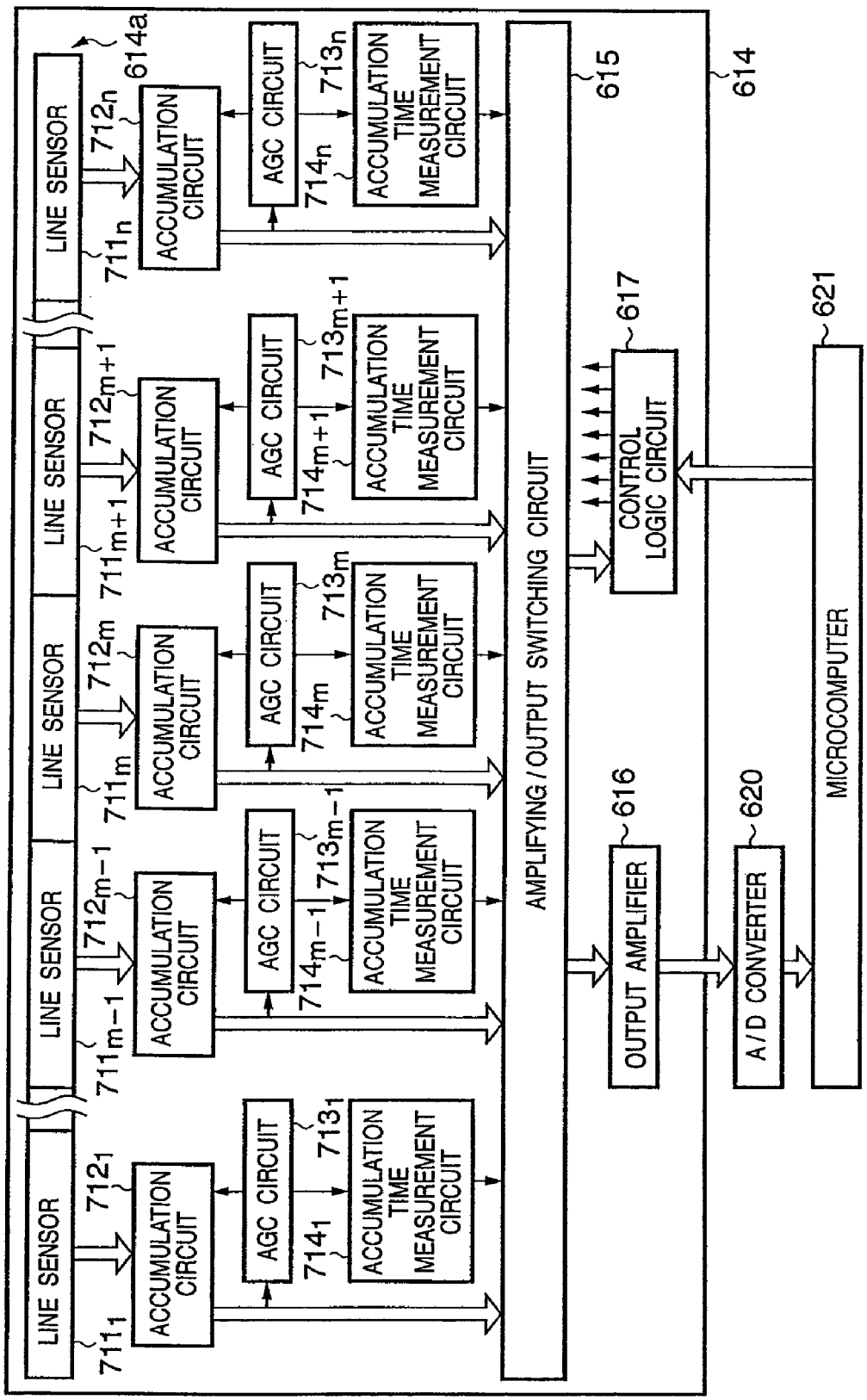
FIG. 20 is a block diagram showing the internal circuit of a light-receiving sensor 614 and its peripheral circuit.

The arrangement of the light-receiving sensor 614 will be described next. FIG. 20 is a block diagram showing the internal circuit of the light-receiving sensor 614 and its peripheral circuit. Note that since the arrangement of a portion which receives image A is the same as that of a portion which receives image B, FIG. 20 shows only the portion which receives image A for the sake of simplification.

The light-receiving sensor 614 has n line sensors $711_1$, $711_2, \ldots, 711_{m-1}, 711_m, 711_{m+1}, \ldots, 711_n$ arranged in a line in the order named. In correspondence with these line sensors, n distance measurement areas are set. Although not shown, for each of the line sensors $711_1$ to $711_n$, an AGC area narrower than the line sensor is set. The line sensor group 614a is comprised of the n line sensors $711_1$ to $711_n$. The line sensor group 611b is also provided with n line sensors in correspondence with the n distance measurement areas described above.

The light-receiving sensor 614 is provided with accumulation circuits $712_1$ to $712_n$, AGC circuits $713_1$ to $713_n$, and accumulation time measurement circuits $714_1$ to $714_n$ in correspondence with the line sensors $711_1$ to $711_n$. The accumulation circuits $712_1$ to $712_n$ accumulate, for each pixel, electric energy photoelectrically converted by the line sensors $711_1$ to $711_n$. The AGC circuits $713_1$ to $713_n$ control reset/start operation and the like for accumulation in the accumulation circuits $712_1$ to $712_n$. In addition, the AGC circuits $713_1$ to $713_n$ detect the accumulation amounts of the respective pixels, and stop accumulation immediately before signals are saturated. The accumulation time measurement circuits $714_1$ to $714_n$ measure the accumulation times detected by the AGC circuits $713_1$ to $713_n$.

The light-receiving sensor 614 is also provided with an amplifying/output switching circuit 615. The pixel information signals from the accumulation circuits $712_1$ to $712_n$ are properly amplified by the amplifying/output switching circuit 615, and an output corresponding to a predetermined line is output.

An output amplifier 616 serving as an output buffer is connected to the output of the amplifying/output switching circuit 615. An analog signal output from the output amplifier 616 is converted into a digital signal by the A/D converter 620. The microcomputer 621 then performs correlation calculation for the signal to calculate a defocus state or distance measurement information. A microcomputer generates control signals for various kinds of processes, controls the respective units, and transmits the control signals.

The light-receiving sensor 614 is also provided with a control logic circuit 617 which performs processing such as decoding for control signals transmitted from the microcomputer 621.

Figure 21:
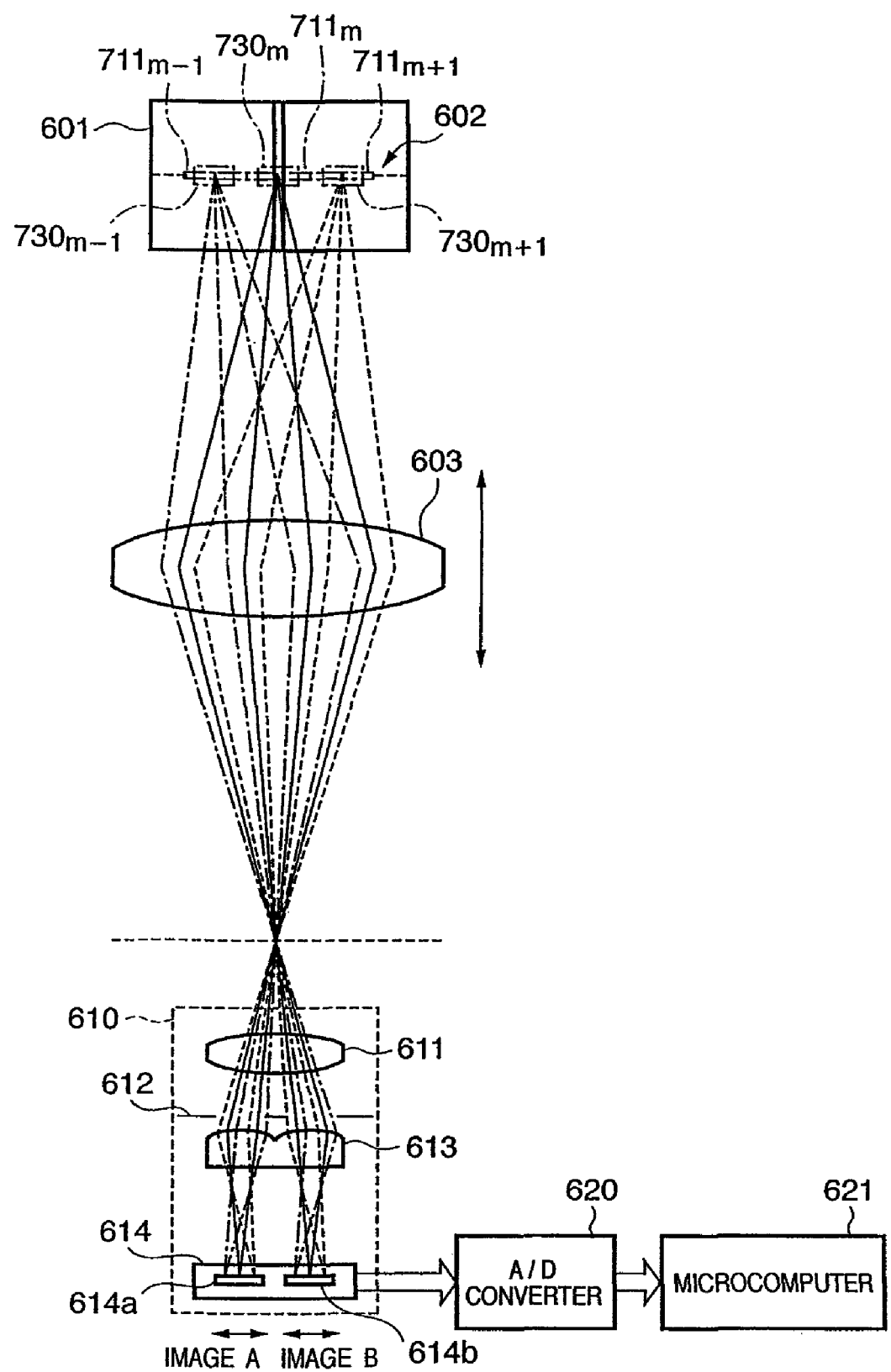
FIG. 21 is a view showing an image 602 obtained by the back projection of line sensors on an object 601 to be photographed.

With regard to the light-receiving sensor 614 having this arrangement, FIG. 21 shows an image 602 obtained by the back projection of the line sensors on the object 601 in FIG. 19. Note that FIG. 21 shows back-projection images of AGC areas $730_{m-1}$ to $730_{m+1}$ provided for the line sensors $711_{m-1}$ to $711_{m+1}$, together with back-projection images thereof.

Figure 22A:
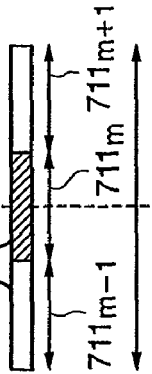
FIGS. 22A to 22C are views showing the relationship between line sensors and image data which corresponds to the defocus state of the focus detection apparatus.
Figure 22B:
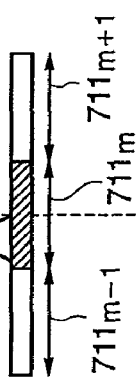
Figure 22C:
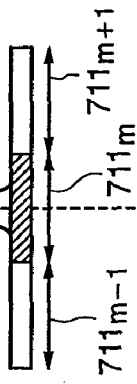

The relationship between line sensors and image data in correspondence with the defocus state of the focus detection apparatus will be described. FIGS. 22A to 22C are views each showing the relationship between line sensors and image data in correspondence with the defocus state of the focus detection apparatus.

When the object 601 is in an in-focus state as shown in FIG. 22A, images A and B are located at the same position on the line sensors $711_m$ indicated by the hatchings on the line sensor groups 614a and 614b. For this reason, the two images are superimposed without shifting them.

Assume that the object 601 is slightly out of focus, i.e., the defocus amount is small, as shown in FIG. 22B. In this case, if the object is far-focused, image A slightly shifts from the middle portion of the line sensor $711_m$ to the left, and image B slightly shifts from the middle portion of the line sensor $711_m$ to the right. If the object is near-focused, these images shift to the opposite sides. Even if such defocus occurs, since the defocus amount is small and both images A and B are located on the line sensors $711_m$, the two images can be made to coincide with each other by shifting the image data (images A and B) on the line sensors $711_m$ indicated by the hatchings. Therefore, correct distance measurement data can be obtained by the line sensors $711_m$.

Assume that the object 601 is greatly out of focus, i.e., the defocus amount is large, as shown in FIG. 22C. In this case, if the object is far-focused, image A greatly shifts from the middle portion of the line sensor $711_m$ to the left, and moves to the line sensor $711_{m-1}$. Likewise, image B greatly shifts from the middle portion of the line sensor $711_m$ to the right, and moves to the line sensor $711_{m+1}$. If the object is near-focused, these images shift to the opposite sides. In this case, the two images cannot be made to coincide with each other only by shifting the image data (images A and B) on the line sensors $711_m$ indicated by the hatchings. For this reason, distance measurement data cannot be obtained by only using the line sensors $711_m$. The incapability of obtaining distance measurement data will also be referred to as distance measurement NG hereinafter.

In such a case, however, the images can be made to coincide with each other by shifting the image data (images A and B) on the line sensors $711_m$, $711_{m-1}$, and $711_{m+1}$, if the images are converted to enlarge a calculation range after the accumulation times of the line sensors $711_m$, $711_{m-1}$, and $711_{m+1}$ are made substantially equal to each other. That is, proper distance measurement data can be obtained by using the line sensors $711_m$, $711_{m-1}$, and $711_{m+1}$. This processing will be described in detail below. FIG. 23 is a flowchart showing the operation of the focus detection apparatus according to the third embodiment.

When distance measurement operation is started, the microcomputer 621 sends a signal to the light-receiving sensor 614. The light-receiving sensor 614 transfers control signals to the AGC circuits $713_1$ to $713_n$ through the control logic circuit 617. Thereafter, the AGC circuits $713_1$ to $713_n$ cause the accumulation circuits $712_1$ to $712_n$ to accumulate signals from the line sensors $711_1$ to $711_n$ (step S2301). That is, after the line sensors $711_1$ to $711_n$ receive light transmitted through the corresponding distance measurement areas and photoelectrically convert the light, the accumulation circuits $712_1$ to $712_n$ start accumulating output signals from the line sensors $711_1$ to $711_n$. Along with this operation, the accumulation time measurement circuits $714_1$ to $714_n$ start measuring accumulation times.

The AGC circuits $713_1$ to $713_n$ detect the accumulation amounts for each pixel in the accumulation circuits $712_1$ to $712_n$ corresponding to the line sensors $711_1$ to $711_n$ in real time, and determine for each of the line sensors $711_1$ to $711_n$ whether the amplitude of each accumulated signal becomes a proper amplitude (step S2302). That is, an AGC circuit 713 performs accumulation control such that an amplitude width as the difference between the maximum value and minimum value of pixels in each of the line sensors $711_1$ to $711_n$ becomes a predetermined amplitude width. When the amplitudes of accumulated signals become proper amplitudes, the AGC circuits $713_1$ to $713_n$ generate signals indicating corresponding information. When an AGC circuit (i) of the AGC circuits $713_1$ to $713_n$ generates a signal indicating that the amplitude of the accumulated signal becomes a proper amplitude, the microcomputer 621 stops the accumulation of signals from a line sensor (i) to which the AGC circuit (i) corresponds (step S2303). Along with this operation, an accumulation time measurement circuit (i) terminates the measurement of an accumulation time.

The microcomputer 621 monitors whether the accumulation operation of all the line sensors $711_1$ to $711_n$ is terminated (step S2304). If there is a line sensor in which the accumulation is not terminated, continuation of accumulation and determination of an accumulation end signal (step S2302) and accumulation end processing (step S2303) are performed until the accumulation operation of all the line sensors $711_1$ to $711_n$ is terminated.

If it is determined in step S2304 that accumulation from all the line sensors $711_1$ to $711_n$ is terminated, the amplifying/output switching circuit 615 performs amplifying/output switching operation and outputs each pixel data (analog signal) in the line sensors $711_1$ to $711_n$ through the output amplifier 616. The A/D converter 620 converts this analog signal into a digital signal and outputs it to the microcomputer 621 (step S2305).

The microcomputer 621 performs correlation calculation on the basis of the pixel information of the predetermined line sensor $711_m$ which acquires a defocus state (or distance measurement data) to calculate a defocus state (or distance measurement data) (step S2306). Note that the predetermined line sensor $711_m$ can be arbitrarily determined.

Subsequently, the microcomputer 621 determines whether this distance measurement result is NG, i.e., images A and B cannot be made to coincide with each other in the line sensors $711_m$ even by shifting the pixel data (step S2307). If distance measurement is not NG, i.e., proper distance measurement data is obtained, the distance measurement operation is terminated.

If it is determined in step S2307 that distance measurement is NG, the microcomputer 621 sends a signal to the light-receiving sensor 614 to output the accumulation times measured by the accumulation time measurement circuits $714_1$ to $714_n$. The light-receiving sensor 614 then outputs the accumulation times measured by the accumulation time measurement circuits $714_1$ to $714_n$ to the microcomputer 621 (step S2308).

Thereafter, the microcomputer 621 normalizes the image data on the basis of the accumulation times such that the pixel data in the line sensors $711_1$ to $711_n$ are obtained for the same accumulation time (step S2309).

The microcomputer 621 then determines how much the calculation range is enlarged with respect to the predetermined line sensor $711_m$ when performing correlation calculation. In this case, a corresponding enlargement coefficient k is set to 0 (step S2310).

The microcomputer 621 substitutes the value of k+1 into the enlargement coefficient k (step S2311), and determines whether the line sensor $711_m$ falls within a corresponding distance measurement area m, and the line sensors $711_{m-k}$ to $711_{m+k}$ fall within the maximum defocus range set from the photographing lens and the distance measurement optical system (step S2312). If the calculation range is to be enlarged beyond the maximum defocus amount, the distance measurement operation is terminated.

If it is determined in step S2312 that the line sensors fall within the maximum defocus range set from the photographing lens and the distance measurement optical system, correlation calculation is performed by coupling the pixel data normalized in step S2309 within the range of the line sensors $711_{m-k}$ to $711_{m+k}$, thereby calculating distance measurement data (step S2313). If distance measurement becomes OK as a result (step S2314), the distance measurement operation is terminated.

If distance measurement does not become OK in step S2314, it is assumed that the shift amount between images A and B greatly deviates from the range set by coupling a plurality of line sensors. Therefore, the flow returns to step S2311 again to enlarge the correlation calculation range. More specifically, k+1 is substituted into the enlargement coefficient k to enlarge the calculation range to one outside line sensor (step S2311). It is then determined whether the range falls within the maximum defocus amount (step S2312). If the range is equal to or more than the maximum defocus amount, the distance measurement is terminated. If the range falls within the maximum defocus amount, correction calculation is performed in the enlarged range (step S2313). Subsequently, this operation is repeated until the calculation rage is enlarged beyond the maximum defocus amount or there is no line sensor for enlargement.

The contents of the flowchart shown in FIG. 23 will be described below with reference to a specific example. FIGS. 24A to 24D are views showing processing contents corresponding to image waveforms in large defocus states. Note that a large defocus state is a state in which the photographing lens greatly deviates from the in-focus position.

Figure 24B:
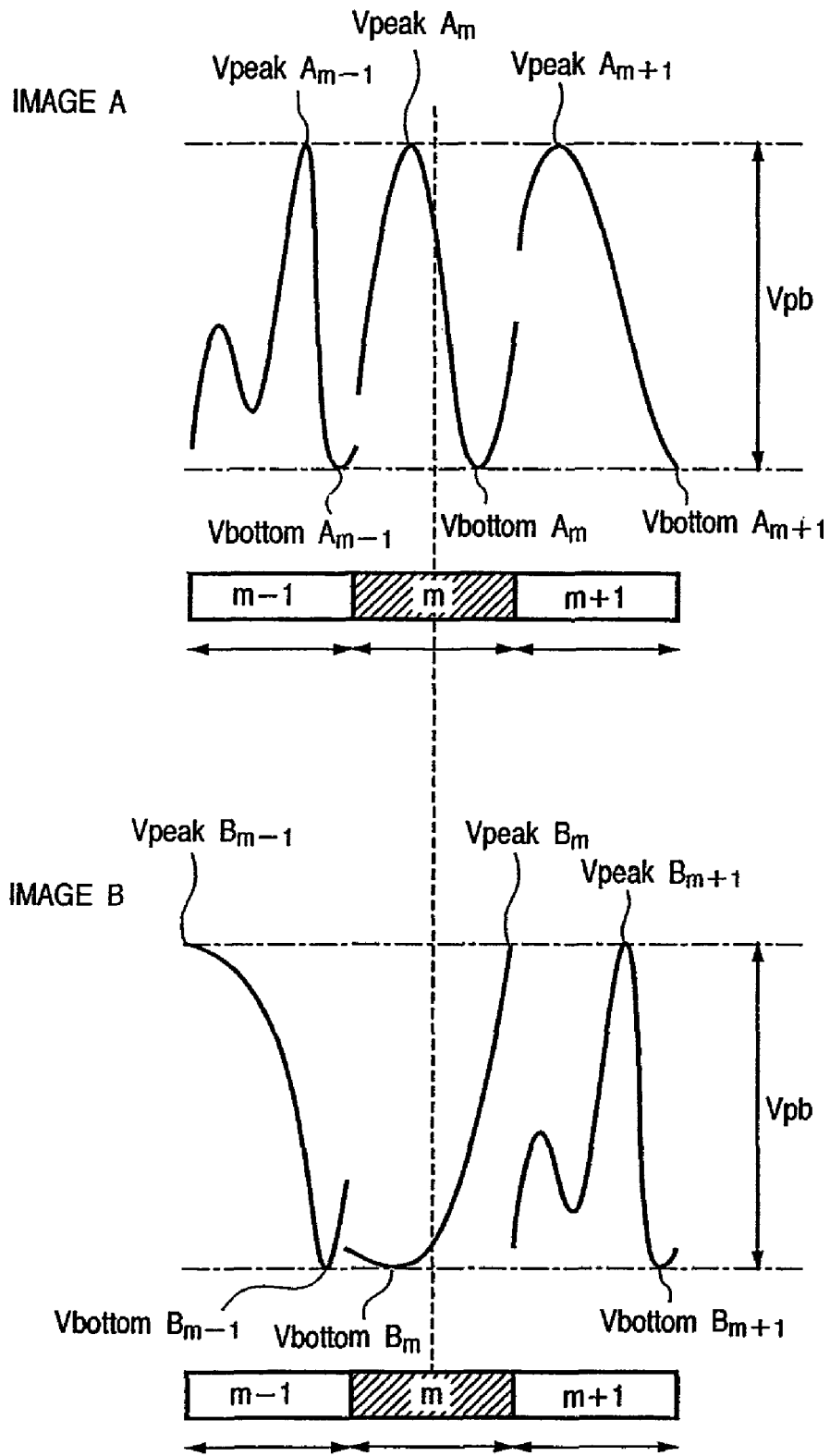

FIG. 24A is a view showing pixel data (image IMG) accumulated in each line sensor for the same accumulation time. In order to describe operation in a large defocus state, assume that the image IMG is greatly out of focus, and the relative position of either of images A and B is greatly shifted from the predetermined line sensor $711_m$. Note that FIGS. 24A to 24D simply show data associated with the line sensors $711_{m-1}$ to $711_{m+1}$, and the relative positional shift exceeds the range of the line sensor $711_m$ but falls within the range of the line sensors $711_{m-1}$ to $711_{m+1}$.

According to the flowchart shown in FIG. 23, first of all, accumulation of output signals from the line sensors $711_1$ to $711_n$ is started (step S2301), and control is performed to make the signals become pixel data of proper accumulation amounts for the respective line sensors $711_1$ to $711_n$ in steps S2302 to S2304. The resultant data are then output (step S2305). As a result, the image data of images A and B shown in FIG. 24B are input as digital values to the microcomputer 621.

In this case, an AGC circuit 713 performs accumulation control for each line sensor to make a maximum value Vpeak and minimum value Vbottom of pixels in the line sensor have a predetermined amplitude width Vpb. For example, with regard to image A, the AGC circuit 713 performs accumulation control to make the difference between a maximum value $VpeakA_m$ and a minimum value $VbottomA_m$ in the line sensor $711_m$, the difference between a maximum value $VpeakA_{m-1}$ and a minimum value $VbottomA_{m-1}$ in the line sensor $711_{m-1}$, and the difference between a maximum value $VpeakA_{m+1}$ and a minimum value $VbottomA_{m+1}$ in the line sensor $711_{m+1}$ coincide with each other. Likewise, with regard to image B, the AGC circuit 713 performs accumulation control to make the difference between a maximum value $VpeakB_m$ and a minimum value $VbottomB_m$ in the line sensor $711_m$, the difference between a maximum value $VpeakB_{m-1}$ and a minimum value $VbottomB_{m-1}$ in the line sensor $711_{m-1}$, and the difference between a maximum value $VpeakB_{m+1}$ and a minimum value $VbottomB_{m+1}$ in the line sensor $711_{m+1}$ coincide with each other. For this reason, as shown in FIG. 24B, pixel data between adjacent line sensors are not always continuous.

Figure 24D:
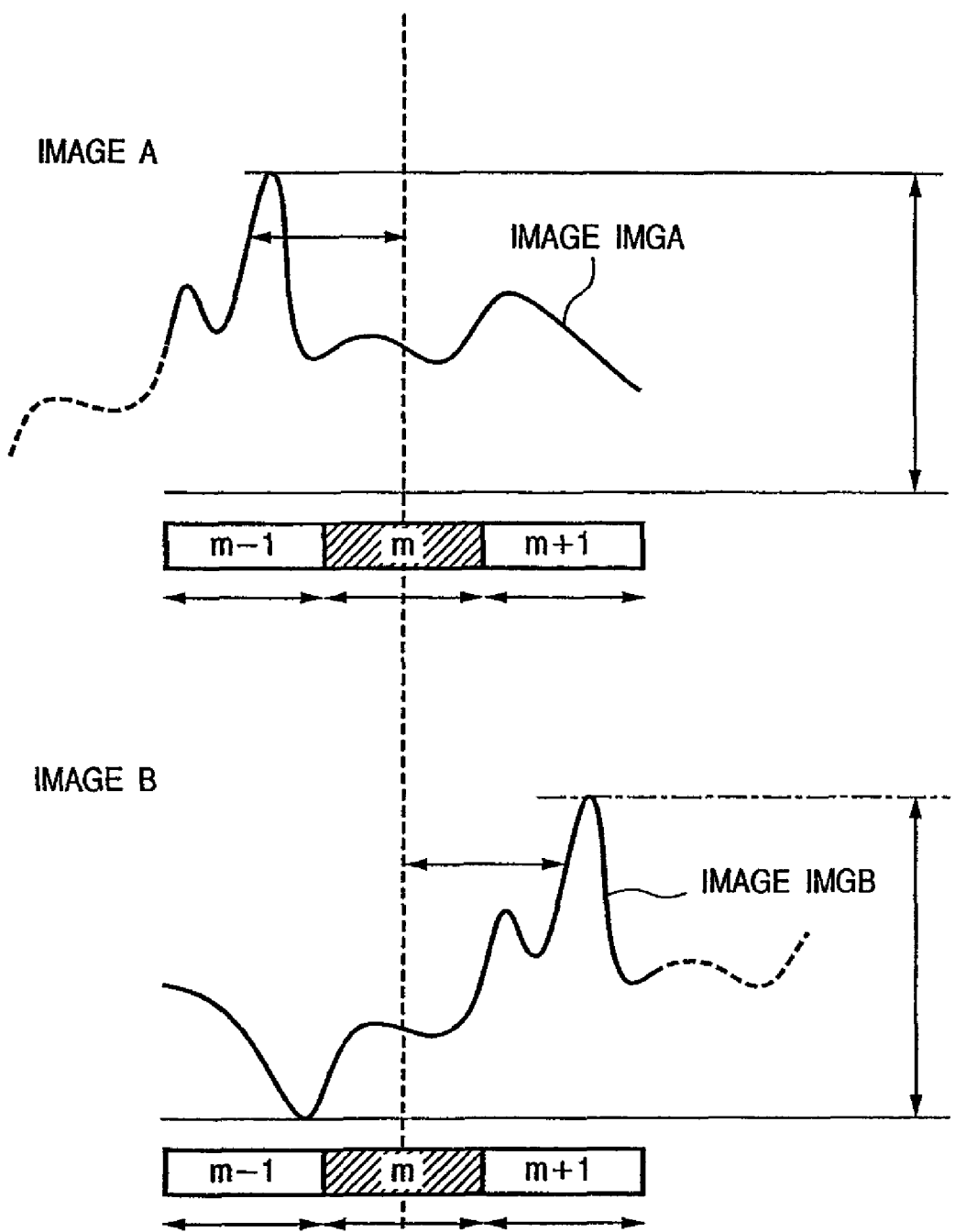

Thereafter, in step S2306 in FIG. 23, correlation calculation is performed with respect to the predetermined line sensors $711_m$ to calculate distance measurement data. FIG. 24C shows this state. In this case, since the defocus amount is large, even if correlation calculation is performed for image A (image $IMGA_m$) and image B (image $IMGB_m$) obtained by the line sensors $711_m$, proper distance measurement data cannot be output because of insufficient shift amounts on the line sensors $711_m$. In step S2307, therefore, it is determined that distance measurement is NG. As a result, in step S2308, accumulation time information is acquired from the accumulation time measurement circuits $714_1$ to $714_n$. In step S2309, the pixel data in the line sensors $711_1$ to $711_n$ are normalized with respect to an image $IMGA_1$ to an image $IMGA_N$ and an image $IMGB_1$ to an image $IMGB_N$ such that the same accumulation time is set. FIG. 24D shows part of this result. Note that FIG. 24D shows the result of normalization of the images $IMGA_{m-1}$, $IMGA_m$, and $IMGA_{m+1}$, and the images $IMGB_{m-1}$, $IMGB_m$, and $IMGB_{m+1}$. As shown in FIG. 24D, performing normalization like that described above makes it possible to obtain continuous image data curves (images IMGA and IMGB) from both images A and B.

After the correlation calculation range is enlarged from that of the line sensor $711_m$ to that of the line sensors $711_{m-1}$ to $711_{m+1}$ in steps S2310 to S2312, distance measurement data is calculated by performing correlation calculation using the enlarged images $IMGA_{m-1}$ to $IMGA_{m+1}$ and the enlarged images $IMGB_{m-1}$ to $IMGB_{m+1}$ in step S2313. As shown in FIG. 24D, when the two images are shifted by the distances indicated by the arrows in this state, the images are superimposed on each other, and hence proper distance measurement data can be obtained. Therefore, distance measurement operation is terminated through step S2314.

As described above, according to the third embodiment, combining the line sensor array of the focus detection apparatus capable of performing distance measurement in a plurality of areas with algorithm processing makes it possible to perform distance measurement operation even in a large defocus state as well as conventional distance measurement operation without using any line sensors for detecting large defocuses which lead to an increase in cost. In addition, even in distance measurement in a large defocus state, accumulation need not be performed a plurality of number of times. This eliminates the necessity to search for a range allowing distance measurement by repeating distance measurement operation while driving the lens or the necessity to perform large defocus accumulation and normal accumulation twice. Therefore, the distance measurement time can be greatly shortened, and photography can be performed without missing photo opportunities. Furthermore, even if the number of distance measurement areas is increased for multifocus detection, distance measurement in a large defocus state can be performed.

Fourth Embodiment

Figure 25:
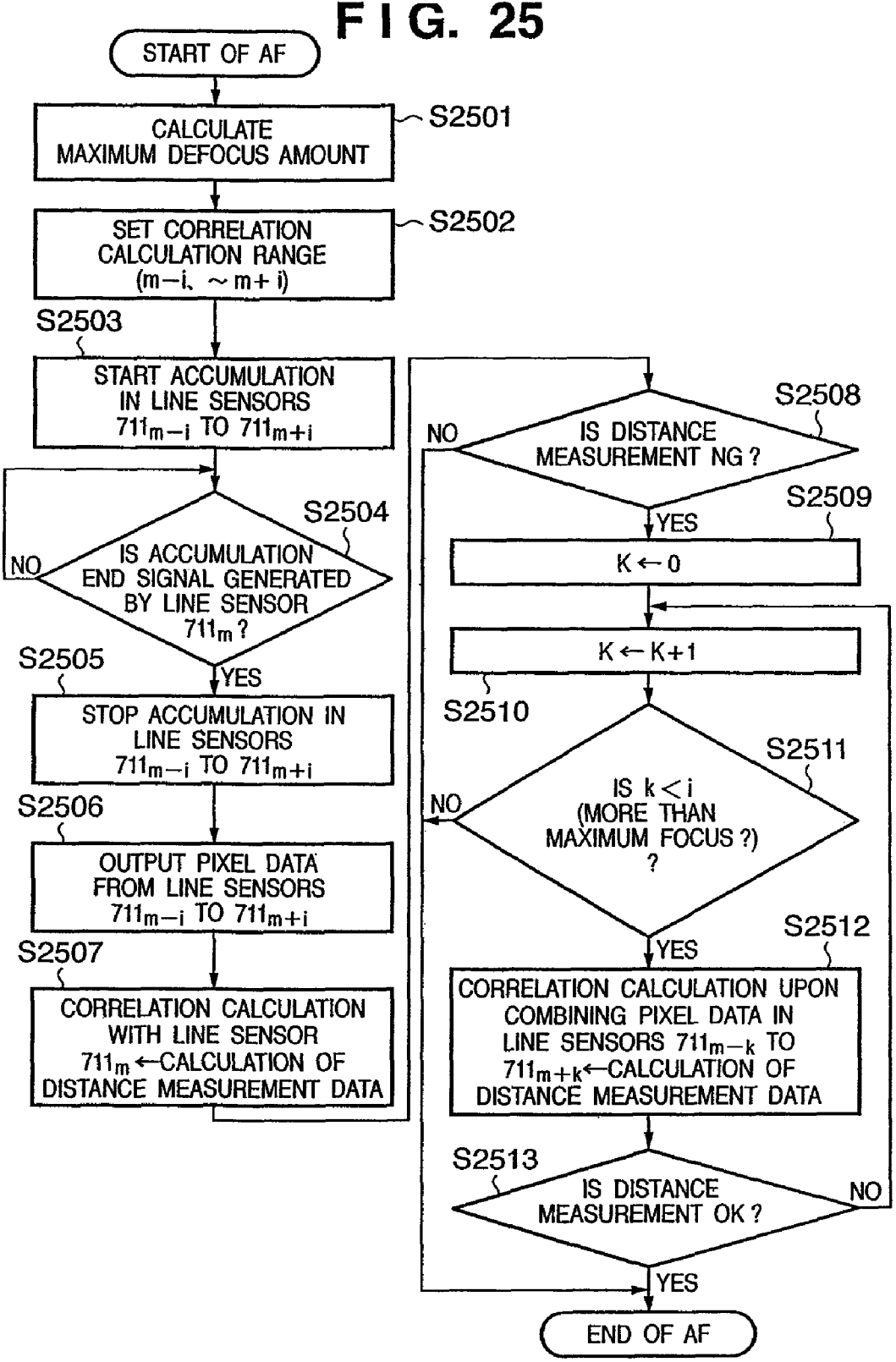
FIG. 25 is a flowchart showing the operation of a focus detection apparatus according to the fourth embodiment.

The fourth embodiment of the present invention will be described next. In the third embodiment, large defocus detection is performed in a predetermined distance measurement area while multipoint distance measurement is performed. In contrast, according to the fourth embodiment, when the large defocus detection mode is set, large defocus detection in a predetermined distance measurement area is performed by using adjacent line sensors for multipoint distance measurement. FIG. 25 is a flowchart showing the operation of a focus detection apparatus according to the fourth embodiment.

When distance measurement is started, first of all, a microcomputer 621 calculates the maximum defocus amount in a defocus state on the basis of information of a photographing lens 603 and of a distance measurement unit 610 (step S2501).

In step S2501, the microcomputer 621 calculates a necessary correlation calculation range on the basis of the calculation result of the maximum defocus amount in step S2501 (step S2502). Note that in this case, the correlation calculation range is the range from a line sensor $711_{m-i}$ to a line sensor $711_{m+i}$ set by enlarging the range of a predetermined line sensor $711_m$ by i consecutive line sensors to the left and right.

The microcomputer 621 sends a signal to a light-receiving sensor 614. The light-receiving sensor 614 transfers controls signals to AGC circuits $713_{m-i}$ to $713_{m+i}$ through a control logic circuit 617. Thereafter, the AGC circuits $713_{m-i}$ to $713_{m+i}$ causes accumulation circuits $712_{m-i}$ to $712_{m+i}$ to start accumulating signals from line sensors $711_{m-i}$ to $711_{m+i}$ (step S2503). That is, after the line sensors $711_{m-i}$ to $711_{m+i}$ receive light beams transmitted through corresponding distance measurement areas and photoelectrically convert them, the accumulation circuits $712_{m-i}$ to $712_{m+i}$ start accumulating output signals.

The AGC circuit $713_m$ detects the accumulation amount for each pixel in the accumulation circuit $712_m$ corresponding to the line sensor $711_m$ in real time, and determines whether the amplitude of the accumulated signal becomes a proper amplitude. The AGC circuit $713_m$ causes the accumulation circuit to continue accumulation until a proper amplitude is detected (step S2504).

If it is determined in step S2504 that the amplitude in the line sensor $711_m$ has become the proper amplitude, accumulation of signals from the line sensors $711_{m-i}$ to $711_{m+i}$ is stopped (step S2505).

An amplifying/output switching circuit 615 performs amplifying/output switching operation and outputs each pixel data (each analog signal) from each of the line sensors $711_{m-i}$ to $711_{m+i}$ through an output amplifier 616. Subsequently, an A/D converter 620 converts this analog signal into a digital signal, and outputs it to the microcomputer 621 (step S2506).

The microcomputer 621 calculates a defocus state (or distance measurement data) by performing correlation calculation on the basis of the pixel information in the predetermined line sensor $711_m$ which acquires a defocus state (or distance measurement data) (step S2507).

Subsequently, the microcomputer 621 determines whether this distance measurement result is NG, i.e., images A and B cannot be made to coincide with each other in the line sensors $711_m$ even by shifting the pixel data (step S2508). If the distance measurement is not NG, i.e., proper distance measurement data is obtained, the distance measurement operation is terminated.

Upon determining in step S2508 that the distance measurement is NG, the microcomputer 621 determines how much the calculation range is enlarged with respect to the predetermined line sensor $711_m$ when performing correlation calculation. In this case, a corresponding enlargement coefficient k is set to 0 (step S2509).

The microcomputer 621 substitutes the value of k+1 into the enlargement coefficient k (step S2510), and determines whether the enlargement coefficient k is smaller than the enlarged maximum line sensor count i corresponding to the maximum defocus amount obtained in steps S2501 and S2502 (step S2511). If the correlation coefficient k is equal to or more than the maximum line sensor count i, the distance measurement operation is terminated.

If it is determined in step S2511 that the enlargement coefficient k is smaller than the maximum line sensor count i, distance measurement data is calculated by performing correlation calculation within the range of the line sensors $711_{m-k}$ to $711_{m+k}$ (step S2512). If it is determined as a result that the distance measurement is OK (step S2513), the distance measurement operation is terminated.

If it is determined in step S2513 that the distance measurement is not OK, it is assume that the shift amount between images A and B greatly deviates from the range obtained by combining a plurality of line sensors. The flow therefore returns to step S2510 to enlarge the correlation calculation range. More specifically, the microcomputer 621 substitutes k+1 into the enlargement coefficient k to enlarge the calculation range by one outside line sensor (step S2510). The microcomputer 621 then determines whether the calculation range is smaller than the maximum defocus amount (step S2511). If the calculation range is equal to or more than the maximum defocus amount, the distance measurement is terminated. Otherwise, correlation calculation is performed within the enlarged range (step S2512). Subsequently, this operation is repeated until distance measurement is OK, the calculation range is enlarged beyond the maximum defocus amount, or there is no line sensor for enlargement.

According to the fourth embodiment, the same effects as those of the third embodiment can be obtained.

In the fourth embodiment, AGC control on a plurality of line sensors is performed on the basis of the end of accumulation in the predetermined line sensor $711_m$. However, the same effects as those described above can also be obtained by performing AGC control on the basis of any one of the line sensors $711_{m-i}$ to $711_{m+i}$ for which accumulation is stopped at the earliest timing.

In either of the third and fourth embodiments, when distance measurement becomes NG in the predetermined line sensor $711_m$, the correlation calculation range is enlarged by one line sensor adjacent to the predetermined line sensor. However, it also suffices if the range is enlarged by two or more line sensors adjacent to the predetermined line sensor. Alternatively, the same effects as those described above can be obtained by enlarging the correlation calculation range by the maximum number of line sensors within the maximum defocus range. Note that in the third embodiment, as the correlation calculation range is enlarged in this manner, the range of line sensors for which the accumulation times for pixel data are normalized must be enlarged. In addition, although the range to be enlarged from the predetermined line sensor $711_m$ is enlarged laterally symmetrically, the same effects as those described above can be obtained even by enlarging the range while weighting or by enlarging the range asymmetrically.

In addition, the same effects as those described above can be obtained by enlarging the correlation calculation range up to the maximum line sensor count (i in the fourth embodiment) within the maximum defocus range from the beginning without determination of OK/NG of distance measurement in the predetermined line sensor $711_m$. Note that in the third embodiment, as the correlation calculation range is enlarged in this manner, the range of line sensors for which the accumulation times for pixel data are normalized must be enlarged.

Furthermore, the accumulation times for pixel data are normalized by the microcomputer 621. However, the present invention is not limited to this. For example, the same effects as those described above can be obtained by providing, in the light-receiving sensor 614, a conversion circuit which converts the output of pixel data corresponding to a normal accumulation time and the output of pixel data from a plurality of selected line sensors into pixel data equivalent to those obtained when accumulation times are normalized to the same accumulation time. That is, when the accumulation time of the line sensor $711_m$ is represented by t, and the accumulation time of the line sensor $711_{m+1}$ is represented by 2t (twice as long as t), the outputs of pixel data corresponding to the normal accumulation times are outputs corresponding to pixel data accumulated for t and 2t, respectively. However, the light-receiving sensor 614 may incorporate a conversion circuit which converts the output of pixel data from the line sensor $711_m$ into ½ the output and keeps the output of pixel data from the line sensor $711_{m+1}$ unchanged in order to normalize the signals into signals based on the same accumulation time.

In addition, the arrangement of line sensors is not limited to one row in the horizontal direction.

Note that the embodiments of the present invention can be realized by causing a computer to execute programs. In addition, a means for supplying the programs to the computer, e.g., a computer-readable recording medium such as a CD-ROM on which the programs are recorded, or a transmission medium such as the Internet which transmits the programs, can be applied as an embodiment of the present invention. The above programs can also be applied as embodiments of the present invention. The above programs, recording media, transmission media, and program products are incorporated in the present invention.

This application claims priority from Japanese Patent Application No. 2004-374766 filed on Dec. 24, 2004, and Japanese Patent Application No. 2005-031277 filed on Feb. 8, 2005, which are hereby incorporated by reference herein.

The invention claimed is:

1. A camera to which a photographing lens having a focus lens is attachable, comprising:
    a focus detection unit which detects a defocus state of the photographing lens from a phase difference between two output signals;
    a pair of light-receiving units which receives at least a pair of light beams passing through the photographing lens and outputs signals to said focus detection unit, said light-receiving units receiving the light beams in a plurality of segmented areas;
    a communication unit which acquires information of the attached photographing lens including a maximum defocus amount which can be generated by the attached photographing lens and current position information of the attached photographing lens by means of communicating with the attached photographing lens; and
    an area determination unit which sets a middle area for detecting the defocus state and peripheral areas for detecting the defocus state in remaining areas adjacent to the middle area based on information of the attached photographing lens including the maximum defocus amount and current position information.

2. The apparatus according to claim 1, further comprising:
    an accumulation unit which accumulates signals obtained by said light receiving unit; and
    an accumulation control unit which controls, for each of the set areas, accumulation of signals obtained in the plurality of set areas of said light-receiving unit using said accumulation unit.

3. The apparatus according to claim 1, wherein said area determination unit obtains the maximum defocus amount at the position of the photographing lens at the time of focus detection from the acquired information of the attached photographing lens, and sets the size of the areas in accordance with the maximum defocus amount.

4. The apparatus according to claim 1, wherein a size of the middle area is limited so as not to be smaller than a predetermined range.

5. A focus detection method using a sensing unit which comprises a plurality of photoelectric conversion elements and receives a light beam passing through a photographing lens for which a focus detection is performed, comprising:
    an accumulation step of accumulating signals obtained by said sensing unit;
    a communication step of acquiring information of the photographing lens including a maximum defocus amount which can be generated by the photographing lens and current position information of the photographing lens by means of communicating with the photographing lens;
    an area determination step of setting a middle area for detecting the defocus state and peripheral areas for detecting the defocus state in remaining areas adjacent to the middle area based on information of the attached photographing lens including the maximum defocus amount and current position information;
    an accumulation control step of controlling, for each of the set areas, accumulation of signals obtained in the set areas in said accumulation step; and
    a defocus detection step of detecting the defocus state of each of the set areas on the basis of the accumulated signal obtained from each of the set areas by the accumulation control in said accumulation control step.

* * * * *